US012774922B2

(12) United States Patent
Kar et al.

(10) Patent No.: US 12,774,922 B2
(45) Date of Patent: Oct. 27, 2026

(54) DEVICE AND METHOD FOR COLOR IDENTIFICATION USING MULTIPLE 2D MATERIAL FILTERS

(71) Applicant: Northeastern University, Boston, MA (US)

(72) Inventors: Swastik Kar, Belmont, MA (US); Davoud Hejazi, Malden, MA (US); Sarah Ostadabbas, Boston, MA (US)

(73) Assignee: Northeastern University, Boston, MA (US)

( * ) Notice: Subject to any disclaimer, the term of this patent is extended or adjusted under 35 U.S.C. 154(b) by 603 days.

(21) Appl. No.: 18/126,364

(22) Filed: Mar. 24, 2023

(65) Prior Publication Data

US 2023/0332955 A1 Oct. 19, 2023

Related U.S. Application Data

(60) Provisional application No. 63/323,236, filed on Mar. 24, 2022.

(51) Int. Cl.

| | |
|---|---|
| ***G01J 3/51*** | (2006.01) |
| ***G01J 3/02*** | (2006.01) |
| ***G01J 3/46*** | (2006.01) |

(52) U.S. Cl.

CPC ............... *G01J 3/51* (2013.01); *G01J 3/0202* (2013.01); *G01J 2003/466* (2013.01); *G01J 2003/467* (2013.01)

(58) Field of Classification Search

CPC ...... G01J 3/51; G01J 3/0202; G01J 2003/466; G01J 2003/467; G01J 3/28; G01J 3/32; G01J 2003/1213

See application file for complete search history.

(56) References Cited

U.S. PATENT DOCUMENTS

| | | | | |
|---|---|---|---|---|
| 2007/0030583 A1* | 2/2007 | Lin | ...................... | G02B 26/008 359/892 |
| 2012/0129269 A1* | 5/2012 | Choi | ...................... | G02B 5/204 356/402 |
| 2017/0248472 A1* | 8/2017 | Roentgen | .............. | G01J 1/0488 |

(Continued)

FOREIGN PATENT DOCUMENTS

| | | | |
|---|---|---|---|
| WO | WO-2010070111 A1 * | 6/2010 | ............ H01J 43/246 |

OTHER PUBLICATIONS

WO-2008131313-A2, Materials systems and methods for optoelectronic devices, Tian et al., Oct. 30, 2008 (Year: 2018).*

(Continued)

*Primary Examiner* — Hina F Ayub

(74) *Attorney, Agent, or Firm* — Adams & Reese LLP

(57) ABSTRACT

The present technology provides devices and methods to determine the spectrum or other spectral characteristic, such as color, of a beam of light or other electromagnetic radiation. The beam of light or other electromagnetic radiation is modified without dispersion by broadband transmissive windows and then transmitted onto a detector. Signals from the detector are measured from a training set of radiation having known spectra and used to train the device, after which the device can estimate the spectrum or color of an unknown light or other electromagnetic radiation with exceptionally high accuracy.

23 Claims, 17 Drawing Sheets

(56) References Cited

U.S. PATENT DOCUMENTS

2020/0200606 A1* 6/2020 Yurt .......................... G01J 3/06

OTHER PUBLICATIONS

Deslippe et al., "BerkeleyGW: A Massively Parallel Computer Package for the Calculation of the Quasiparticle and Optical Properties of Materials and Nanostructures", Computer Physics Communications 2012, 183 (6), 66 pages.
Ding et al., "Research on Computer Vision Enhancement in Intelligent Robot Based on Machine Learning and Deep Learning", Neural Computing and Applications (2022) 34:2623-2635.
Blancon et al., "Extremely Efficient Internal Exciton Dissociation through Edge States in Layered 2D Perovskites", Science, 355, pp. 1288-1292 (2017).
Finalyson, G. D., "Colour and Illumination in Computer Vision", Interface Focus 2018, 8 (4), 20180008, 8 pages.
Esteva et al., "Deep Learning-Enabled Medical Computer Vision", npj Digital Medicine 2021, 4 (1), 1-9.
Tomikj et al., "Vehicle Detection with HOG and Linear SVM", Journal of Emerging Computer Technologies, 2021, 1 (1), pp. 6-9.
Cubero et al., "Advances in Machine Vision Applications for Automatic Inspection and Quality Evaluation of Fruits and Vegetables", May 2011Food and Bioprocess Technology 4(4):487-504.
Wan et al., "A Methodology for Fresh Tomato Maturity Detection Using Computer Vision", Computers and Electronics in Agriculture 2018, 146, 26 pages.
Sabela et al., "A Review of Gold and Silver Nanoparticle-Based Colorimetric Sensing Assays", Advanced Engineering Materials, (2017), 24 pages.
Hejazi et al., "Transition Metal Dichalcogenide Thin Films for Precise Optical Wavelength Estimation Using Bayesian Inference", ACS Applied Nano Materials, 2019, 2 (7), 10 pages.
Chernikov et al., "Exciton Binding Energy and Nonhydrogenic Rydberg Series in Monolayer WS2", Physical Review Letters 2014, 113 (7), 076802, 5 pages.
Mak et al., "Tightly Bound Trions in Monolayer MoS2", Nature Materials 2013, 12 (3), 207, 5 pages.
Bilgin et al., "Resonant Raman and Exciton Coupling in HighQuality Single Crystals of Atomically-Thin Molybdenum Diselenide Grown by Vapor Phase Chalcogenization", ACS Nano, (2017), 43 pages.
Panwar et al., "A Deep Learning and Grad-CAM Based Color Visualization Approach for Fast Detection of COVID-19 Cases Using Chest X-Ray and CT-Scan Images", Chaos, Solitons & Fractals 2020, 140, 110190, 12 pages.
Soenksen et al., "Using Deep Learning for Dermatologist-Level Detection of Suspicious Pigmented Skin Lesions from Wide-Field Images", Science Translational Medicine 2021, 13 (581), 12 pages.
Johnson et al., "Enhanced Field-Based Detection of Potato Blight in Complex Backgrounds Using Deep Learning", Plant Phenomics (2021), 13 pages.

* cited by examiner

DEVICE AND METHOD FOR COLOR IDENTIFICATION USING MULTIPLE 2D MATERIAL FILTERS

CROSS REFERENCE TO RELATED APPLICATIONS

This application claims the priority of U.S. Provisional Application No. 63/323,236, filed 24 Mar. 2022 and entitled "Device and Method for Color Identification Using Multiple 2D Material Filters", the whole of which is hereby incorporated by reference.

STATEMENT REGARDING FEDERALLY SPONSORED RESEARCH OR DEVELOPMENT

This invention was made with government support under Grant No. 1351424 awarded by the National Science Foundation. The government has certain rights in the invention.

BACKGROUND

Color recognition is pivotal for identification of objects both by living beings (1-3) and machines (4,5). Broadband color recognition involves initial dispersion into red (R), green (G), and blue (B) regions of the visible spectrum and subsequent comparison with a database. The human eye, with cone cells broadly sensitive to R, G or B regions, distinguishes about a million colors as a primary neurocognitive database (6). Machines up to now use 3-filter-RGB or 4-filter cyan-yellow-green-magenta (CYGM) based color sensors (7). A standard digital camera using RGB filters can theoretically create a machine-cognitive database of $256^3$ (about ~16.8 million) colors. Machine vision (8) and other color-detection hardware using such databases enable automation in a wide range of applications ranging from medical diagnostics (9), vehicular control (10), food-quality assessment (11,12), and smart agriculture (13), to soil (14), and marine ecology monitoring (15). Advances in colorimetric sensors (16) can enable rapid viral diagnostics (including norovirus (17) and SARS-CoV-2 virus (18)), and water toxicity (19). Despite having wide-ranging applications, filter-based dispersion methods constantly need improved estimation accuracy and reliability (20), yet these methods have remained the fundamental basis for color recognition since Maxwell used three filters to produce the first color photograph in 1861 (21).

SUMMARY

The present technology provides devices and methods to estimate the color of a beam of light, It also can be used to determine the spectrum (wavelength-dependent intensity) of any form of electromagnetic radiation over a selected wavelength band, with out dispersing the radiation into its component wavelengths. The same beam of light or other electromagnetic radiation is first modified by broadband transmissive windows or filter and then transmitted onto a detector, such as a photodetector. When the light passes through such a transmission window, its original spectrum gets modified by the transmittance spectrum of the transmission window, and the photocurrent produced by the photodetector changes accordingly. By using a set of multiple (such as 3-12) different transmissive windows, each having a different transmission spectrum in the wavelength band of interest, a series of different photocurrents is produced. When the device is trained with a large number of differently colored light, or other electromagnetic radiation having different known spectra, it is capable of estimating the spectrum or color of an unknown light or other electromagnetic radiation with exceptionally high accuracy.

BRIEF DESCRIPTION OF THE DRAWINGS

FIG. 1A shows a schematic outlining a device and process for data-collection, modification, and data storage and testing in performed in a dark enclosure 150. A python-code-programmable small video monitor was used as a source of colored light 130 (with unique RGB values). The broadband spectrum Si(λ), for the $i^{th}$ set of RGB values, was separately measured and stored. The generated colored light was modified by a set of N=12 transmissive windows 110 (with transmittance, Tn), one at a time, and the transmitted broadband light illuminated a photodetector 140. The photocurrent $I^i_n$ was collected and stored in computer 160. $I^i_n$ was related to Si(λ), Tn, and the responsivity R(λ) of the photodetector and a geometric factor C, as shown. FIG. 1B is a schematic depicting the daisy-wheel arrangement of the 12 transmissive windows 110 mounted on a disk 120 (top). The bottom panel shows the transmittance curve and optical image of a typical transmissive window. Each window is a 2D TMD grown on a transparent sapphire substrate. Also shown is a microscope image from a segment of this transmissive window, where the grown 2D materials are visible. FIG. 1C shows an application of the k-nearest neighbor (k-NN) method with k=1, where only two transmissive windows (n=1, 2 out of N) and five groups of data (Si=1-5) are shown. For each i, an N-dimensional datapoint Si=Si(#", $" . . . %") was generated and stored for (RGB)i, where multiple measurements for the same color form clusters (datapoints plotted with same colors). These datapoints form the training set. Here, i=3 is the nearest neighbor class for the test sample D=D(#", $" . . . %"). In FIG. 1D, tested primary colors (red at left pair, green in middle pair, and blue at right pair), of varying intensities (saturations) are shown in the left column of each two-column pair, with their estimated corresponding colors shown on the right column. The methods outlined in FIGS. 1A-1C were used for estimation. The device was able to "recognize" these primary colors with 100% accuracy.

FIG. 2A shows simulated "straight-line" window transmittance curves that were used to determine the effect of the difference in slope between N=2-windows on the RGB-estimation error. The slope of one curve (bold, positive slope) was kept fixed, while that of the other was changed in equal steps of the internal angle between the curves, SOn, as labeled. FIG. 2B shows the variation of percentage error with SOn obtained from simulated "two-window" estimation of tested RGB-values. The error decreased for increasing SOn, providing the design principle that windows with larger differences in transmittance slopes would lead to better color estimation. It was also found (not shown) that as the transmittance of the windows become more "horizontal", their efficacy in estimation becomes poorer, due to poorer differentiation between colors across different wavelengths. These simulations indicate the importance of creating windows with steep transmittance curves with varying slopes. FIG. 2C shows four pairs of simulated transmission curves, with "dips" mimicking excitonic features of TMDs at different positions. FIG. 2D shows simulated RGB-estimation error for each simulated transmittance pair in FIG. 2C. For pair 1, with two straight lines result in the highest error among these four, while for pair 4, with two distinct simulated excitonic peaks in different locations across the windows shows the lowest error. These two figures provide the design principle of using materials with different locations of excitonic peaks for more accurate color estimation. FIG. 2E shows a flowchart depicting how windows with variable transmission properties were fabricated based on the design principles suggested by simulations. FIG. 2F shows light microscope images of several transmissive windows fabricated from pure 2D materials or mixtures of different 2D materials. FIG. 2G shows transmittance curves of selected windows with a blank sapphire substrate used as reference. FIG. 2H shows the error in estimating colors when only two of the physical windows characterized in FIG. 2G were used. For this purpose, one transmittance curve was kept fixed, as labeled in FIG. 2G; the fixed curve was paired with each of the other 10 windows.

FIG. 3A shows the distribution of spectral deviation over 1337 test color samples, when the model was trained with the same 1337 colors. The error is shown in log scale for clarity. The inset figure shows a schematic representation of the process of estimating a test color that was part of the set previously used to train the model. Briefly, a test color was set and projected via a screen, and the output light was collected by a data acquisition system, i.e., a set of transmissive windows and a photodetector. Then, the measured data were compared to the training data collected earlier from the same "seen" colors to estimate the RGB values of the test color. FIG. 3B shows a measured spectrum (circles) of a typical tested color, compared to the spectrum of the estimated color (line). The spectrum and color estimation matched very well with the measured values. FIG. 3C shows the estimated and tested colors and their respective spectra for the worst case, having the largest spectral deviation. FIG. 3D shows the mean spectral deviation observed over 1337 test samples when different numbers of transmissive windows were used for data collection and estimation. The average spectral deviation decreased as a greater number of transmissive windows were used. FIG. 3E shows the actual colors of the 1337 tested and estimated samples. Each tested-estimated pair is indicated with "t" for tested and "e" for its corresponding estimated color.

FIG. 4A shows a schematic representation of a process of estimating test colors by comparing them to a database of 0.55 million computationally synthesized colors (i.e., not actually measured ones). FIG. 4B shows pairs of color columns. The color columns on the right are representations of the 1487 tested colors vs. their estimated nearest color of the 0.55 million computationally synthesized colors. FIG. 4C shows the distribution of spectral deviation % over the 1487 tested colors. The inset shows the spectral deviation in log scale for more clarity. FIG. 4D shows the measured spectrum of a typical tested color compared to the spectrum of the estimated color. FIG. 4E shows the spectral deviation of test color samples vs. the photocurrent that each color created in the photodetector, when the light passed through air only and not through the transmissive windows. The photocurrent value is related to the intensity of the incident light, so, this figure shows that the smaller the photocurrent or light intensity, the more difficult the estimation becomes high intensity or bright lights are easier to estimate. The data from all transmissive windows were used for estimation here. FIG. 4F shows a schematic representation of testing and estimating randomly selected colors that were not part of the synthesized or measured training data. The measurement of the random colors was compared to the synthesized training set to estimate the colors. On the right, the actual tested vs. estimated colors are shown for a few of these random samples.

FIGS. 5A and 5C show the relative positions of LCD screen, the focusing mirror, photodetector, and the sample holder disk under the photodetector. All components are placed inside the box as shown in FIG. 5B before starting an experiment. The LCD screen, spectrometer, and power-meter are connected to the computer via cables that are let out of the box with covered holes under the box.

DETAILED DESCRIPTION

Figure 1A:
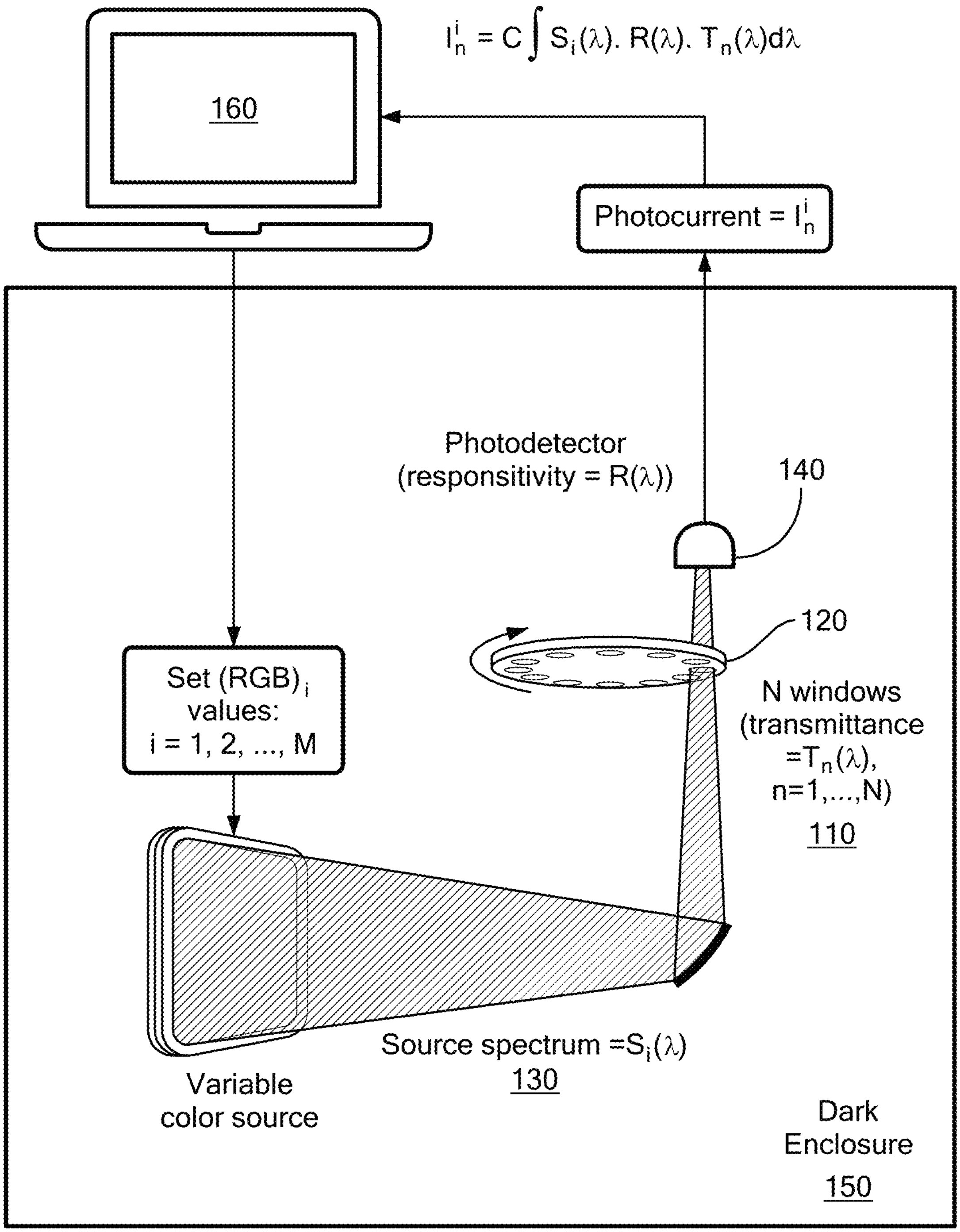
FIGS. 1A-1D show color training and testing of a device according to the present technology.

The present technology makes it possible to recognize color with near-perfect spectral match, without regard to spectral complexity and without using RGB, CYGM, or any other dispersive filtering methods. A previous invention demonstrated how the wavelength of monochromatic light can be estimated using dispersion-free optical windows and machine learning with ultrahigh accuracy (see references 22 and 23, and published patent application US2022/0412804 A1, each of which is hereby incorporated by reference). In contrast, the present invention provides a new color identifying device and method, which are capable of broadband color recognition with exquisite precision and reproducibility. Unlike monochromatic light, broadband colored light can contain arbitrary wavelengths each with arbitrary intensities, and hence its accurate recognition is a considerably more complex task, which has now been achieved through a combination of materials and machine-learning innovations.

Visible light, originating either from a radiative source or reflected from a surface, has an optical spectrum, which is the variation of intensity vs. wavelength. Spectrometers use dispersion to split the light into its various constituent wavelengths, and intensities of light with different wavelengths are measured by photodetectors. A spectrometer can hence analyze and reproduce this distribution of intensities as a function of wavelength but does not have color perception or recognition. Color is based on signals generated by the biological eye and perceived by the brain. Color perception is limited to the visible range of electromagnetic spectrum, i.e., approximately $\lambda$~400 nm-750 nm. Up to now, color-detection tools have typically used RGB filters to disperse the light into three regions, red, green, and blue, each with an intensity ranging from 0-255. Upon reproducing the color emitters (or images) on a display tool such as LCD monitors, the eye can detect the color and the brain compares it to the closest recognizable color. Thus, the eye and brain can perceive color but do not determine or estimate a spectrum. This is a uniquely different way of analyzing, distinguishing, or recognizing light, compared to spectroscopy. The present invention can determine both a spectrum of any form of light (e.g., reflected or transmitted), but it can also determine color of light by comparison to a training set of colors. In both cases, the device measures a current from a photodetector, resulting from light impinging on the photodetector after being selectively transmitted through a set of 2D material broadband filters, each different from the others of the set in its transmission spectrum.

An embodiment of the device of the present technology exploits the unique optical transmittance of 2D transition metal dichalcogenides (TMDs), in particular their wideband variable transmittance in the visible wavelength band, superimposed with "dips" arising from excitonic absorption processes (24,25). Guided by simulations, variable-transmittance "windows" or "filters" were fabricated by vapor phase synthesis (26,27) of TMDs on transparent sapphire substrates. Incoming colored light gets spectrally modified by each of these windows, resulting in different photocurrent readings for the same photodetector. These photocurrent variations were used to create a "training database" and subsequently test a range of previously "seen" and synthesized "unseen" colors. Color recognition was framed as a k-nearest neighbor (k-NN) photocurrent-based classification problem, where each RGB combination is a class. When tested, greater than 99.99% and 99% spectral fidelity was obtained for the seen and unseen colors, respectively. The present implementation of machine learning for color recognition is distinctly different from the type of machine learning commonly used for post-detection analytics of color data (28-31).

FIG. 1A outlines the "known color" training and "test color" estimation steps. For an ideal photodetector with responsivity R(A), incident light with a spectrum Si(A) (labeled by its $^{ith}$ RGB combination) will lead to a photocurrent $I^1$~f $S_1$(A)R(A)dA. As shown, the device first modifies the original spectrum by passing this light through the $^{nth}$ (of N=12) transmissive windows (each with a transmittance Tn(A)). During training, each such window modifies the photocurrent to I"#-f $S_1$(A)R(A)$T_s$(A)dA. Hence each RGB combination maps onto an N-dimensional photocurrent datapoint, $$Di = Di(I^{\#}_{\%} I^{\#}_{\&}).$$

Figure 1B:
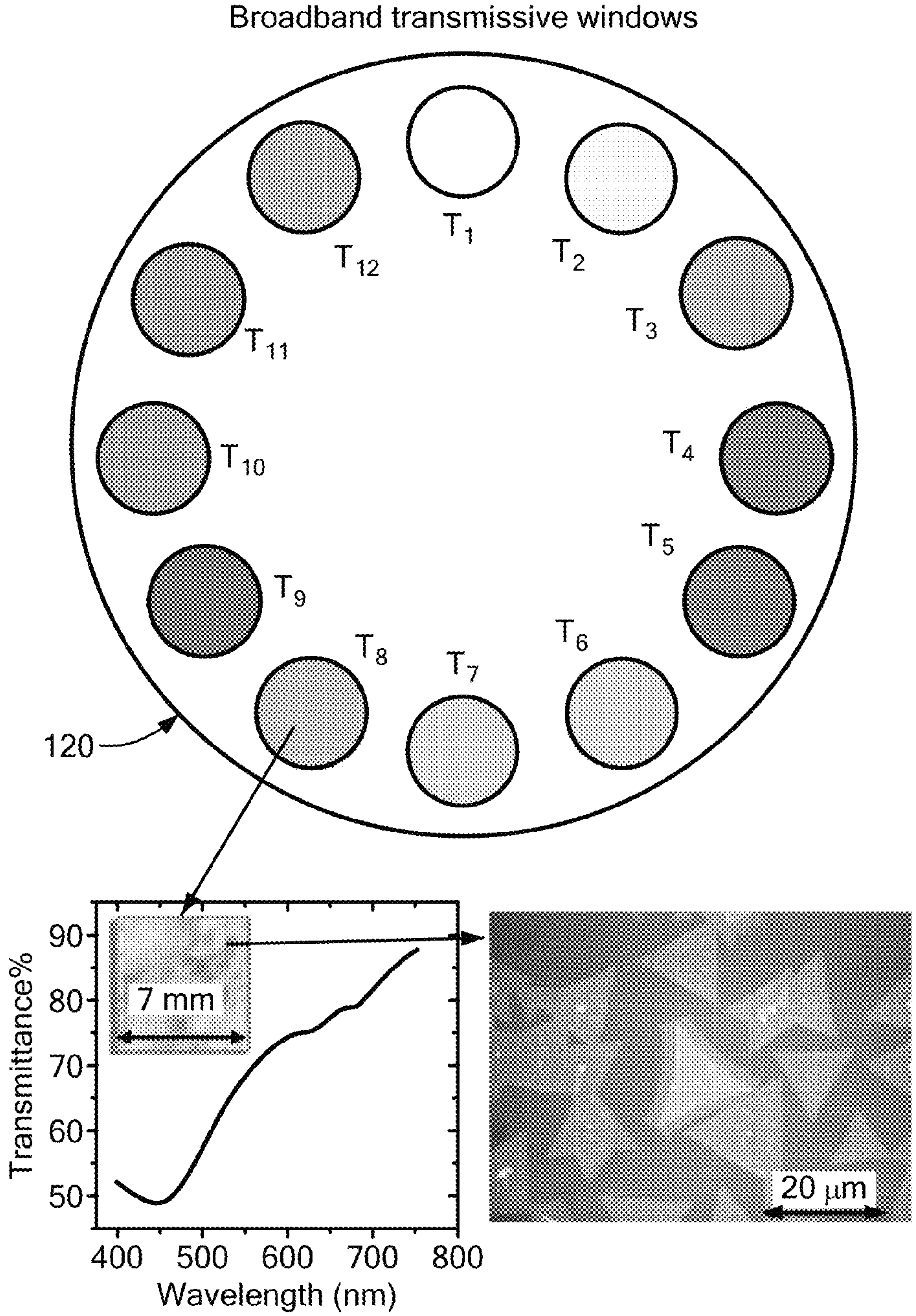

Initially, the device was trained using 1,337 colors, which are then referred to as "seen" colors, with R, G, and B values each ranging from 60-255, in steps of A=20. FIG. 1B schematically shows the daisy wheel arrangement designed to accommodate the 12 transmissive sapphire+2D material windows, as shown, along with optical images of one of the windows at different levels of magnification. The bottom panel also shows the spectral transmittance of this window.

Figure 1C:
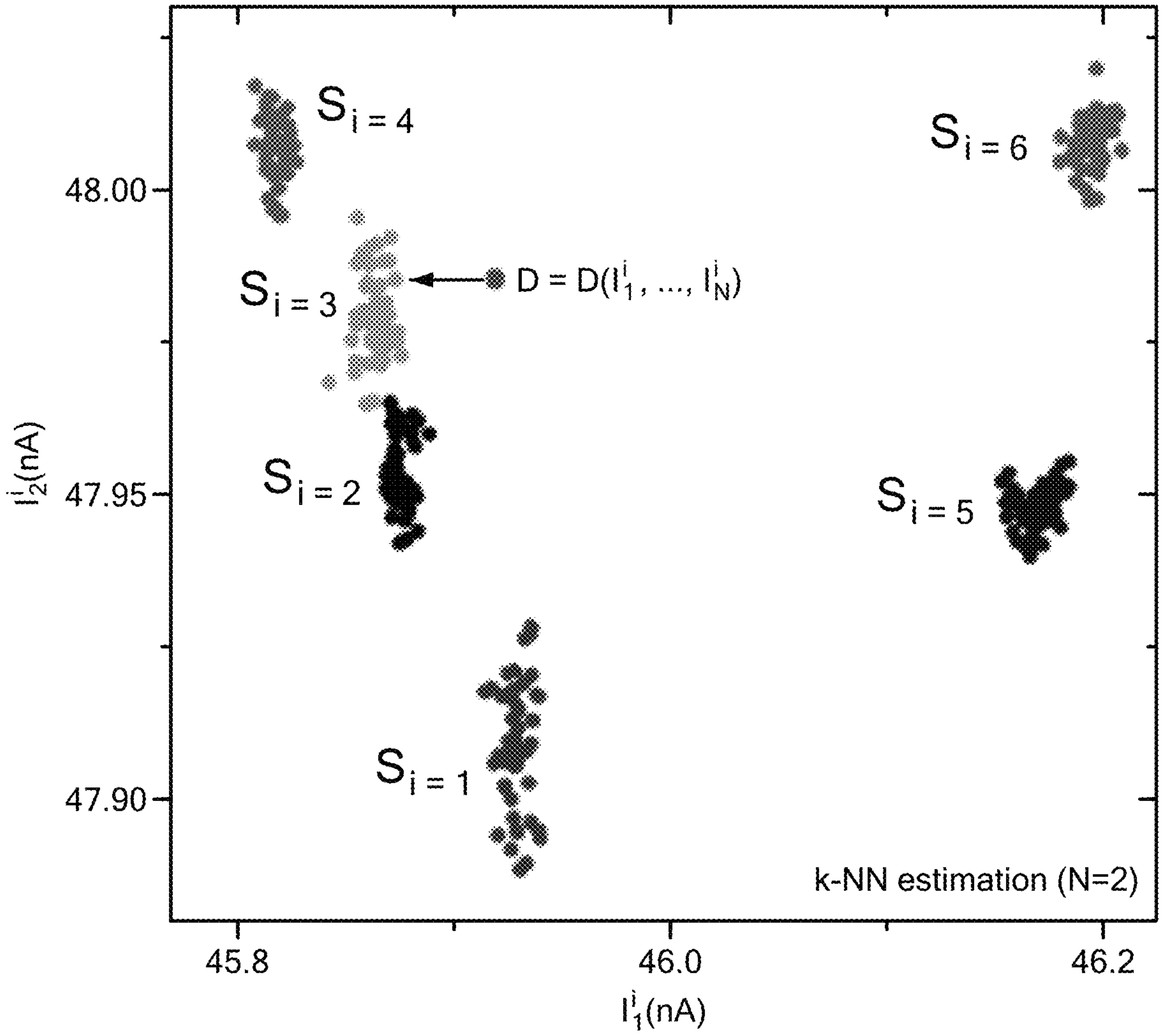
Figure 1D:
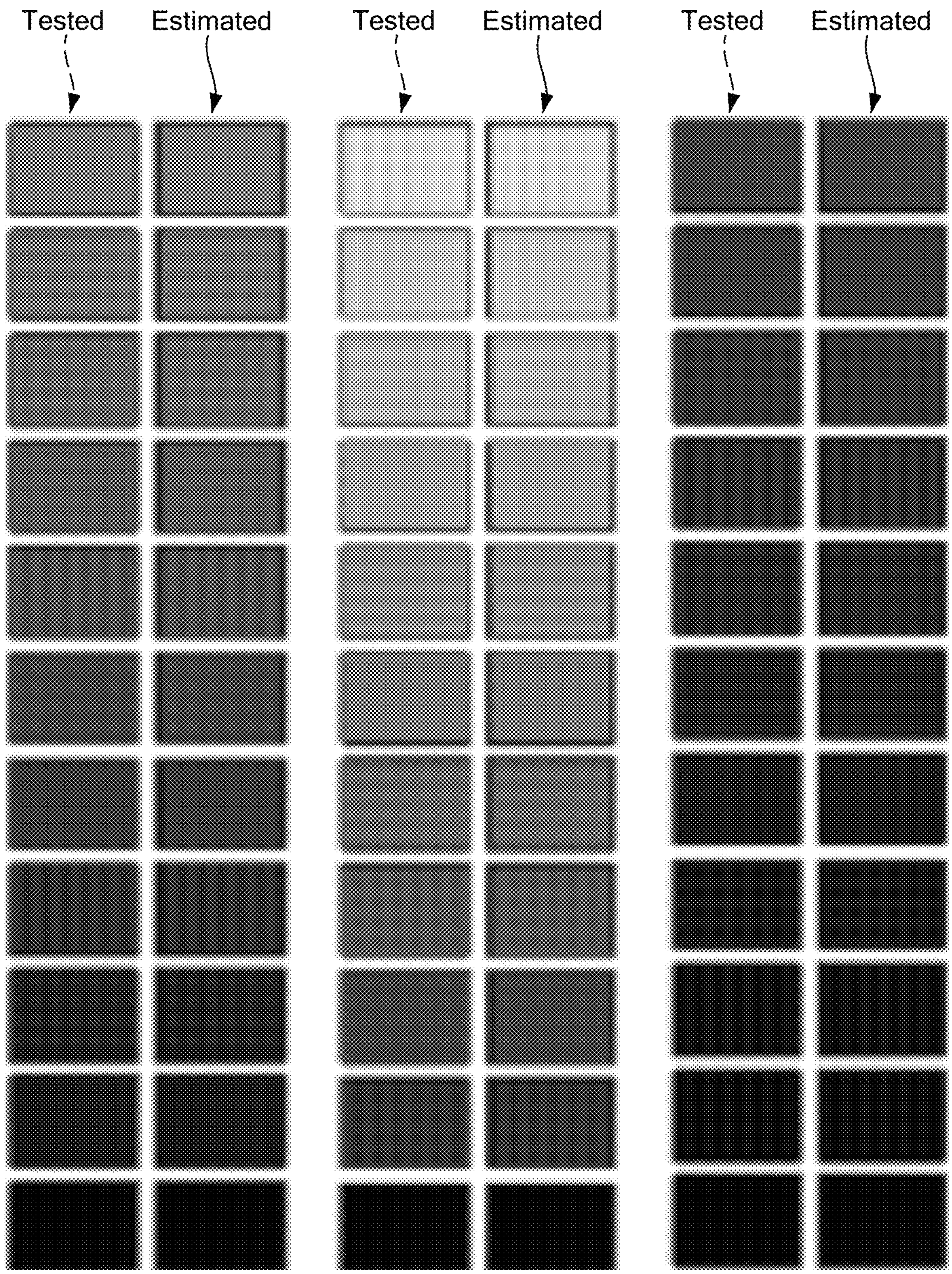

The natural inhomogeneity of the 2D materials adds further variations to Tn(λ), which further benefits the classification process. FIG. 1C schematically describes the classification using N=2 windows as an example, where the cluster of datasets (formed from 50 repeated measurements) each represent an RGB "class", and the 2-dimensional photocurrent from a test color is assigned to a class based on its k-NN proximity. The 12-window equivalent of this would test the same for a 12-dimensional "distance" from the nearest datapoint in a class. FIG. 1D showcases the remarkable visual accuracy with which the present technology can reproduce all three primary colors at various intensities, without any dispersion, using 12 windows and a single photodetector. The rms spectral accuracy of these estimations was 100%.

Figure 2A:
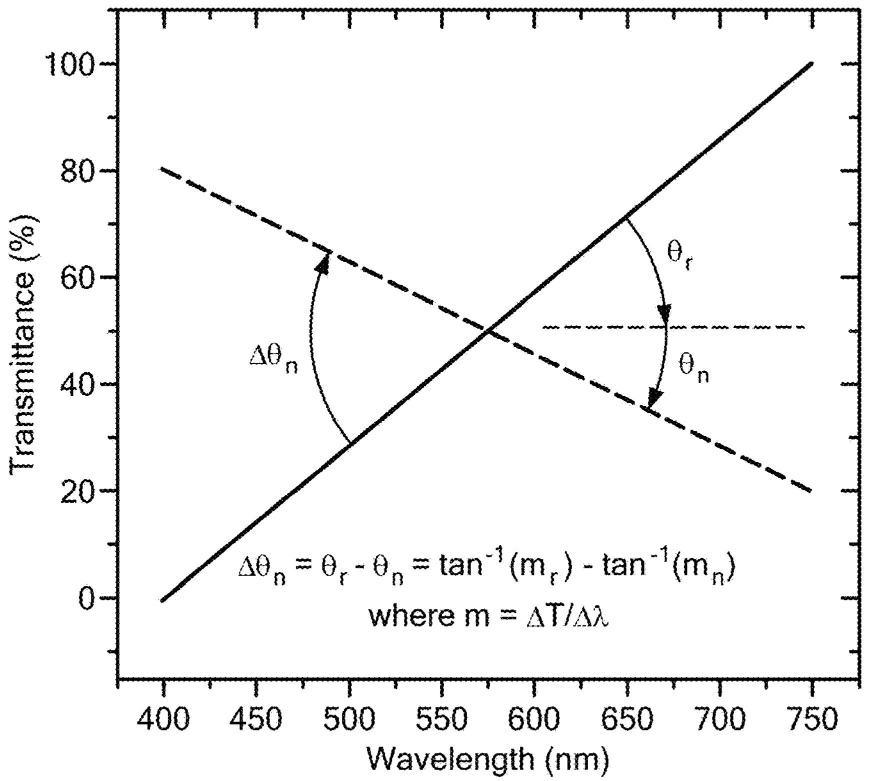
FIGS. 2A-2H depict the design and fabrication of transmissive windows.
Figure 2B:
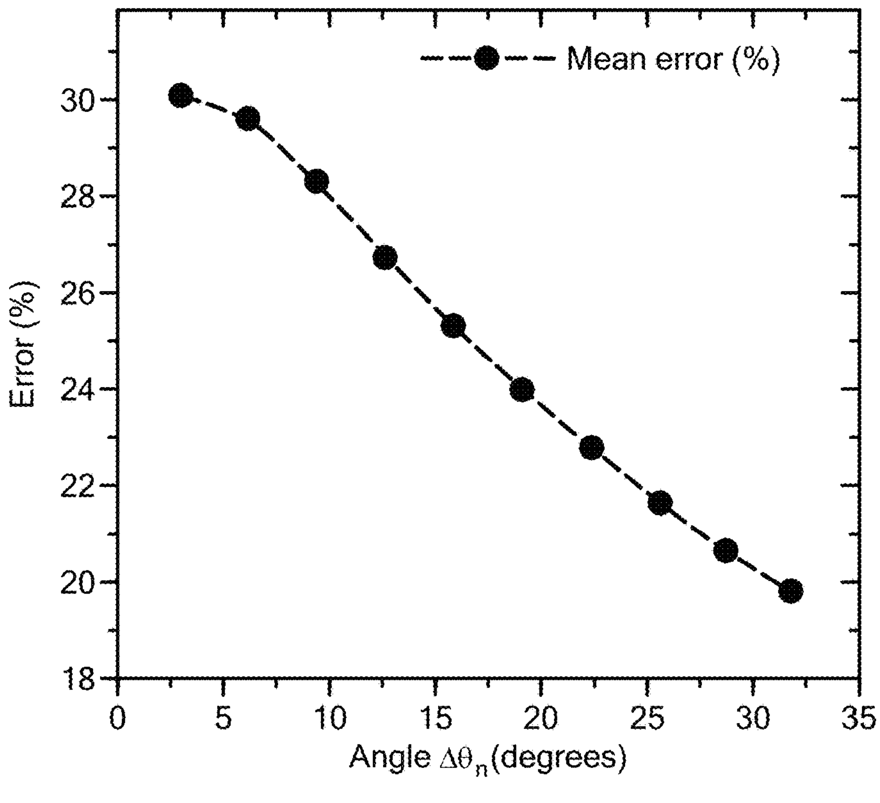
Figure 2C:
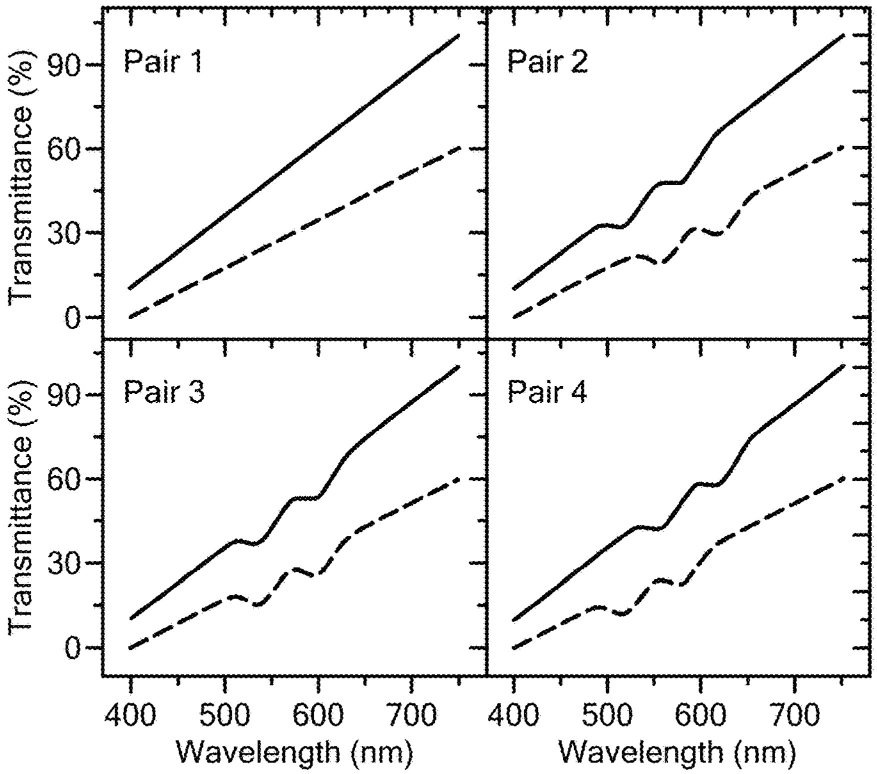
Figure 2D:
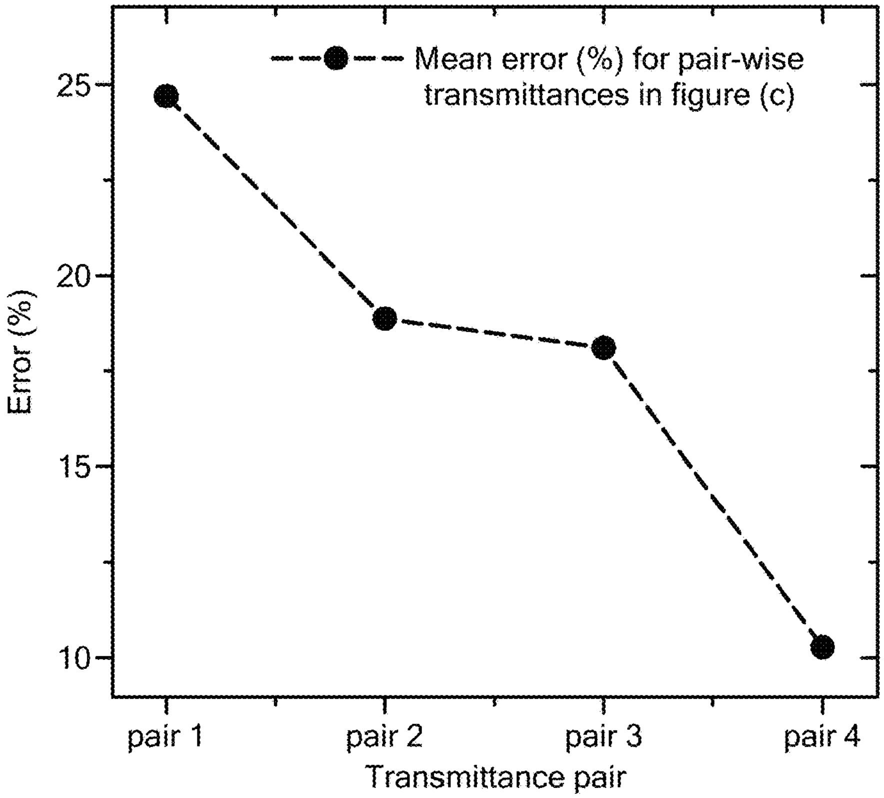
Figure 2E:
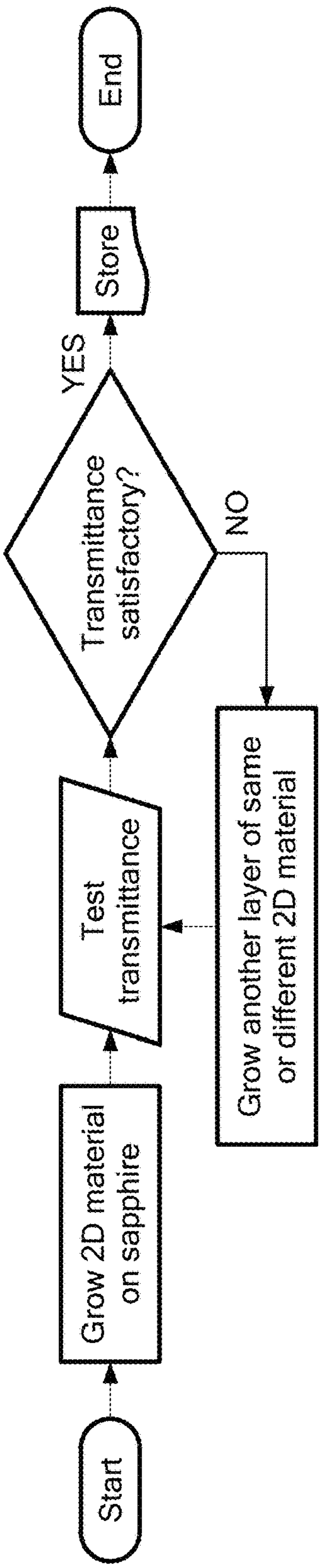
Figure 2F:
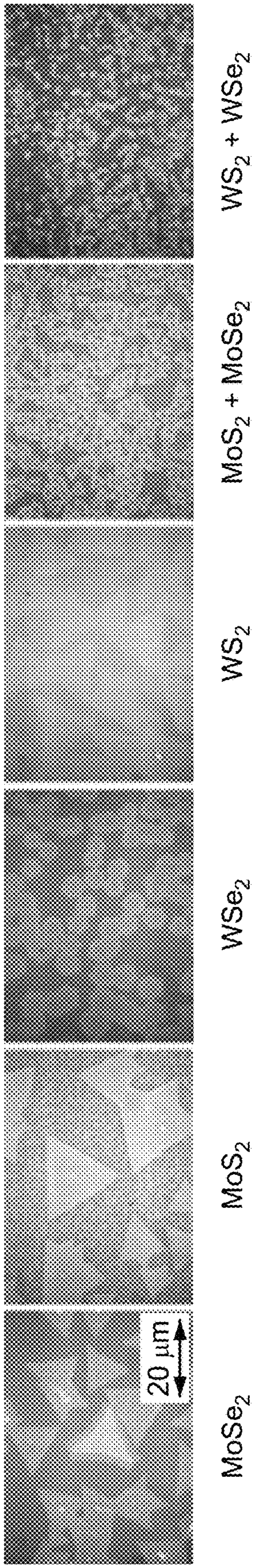
Figure 2G:
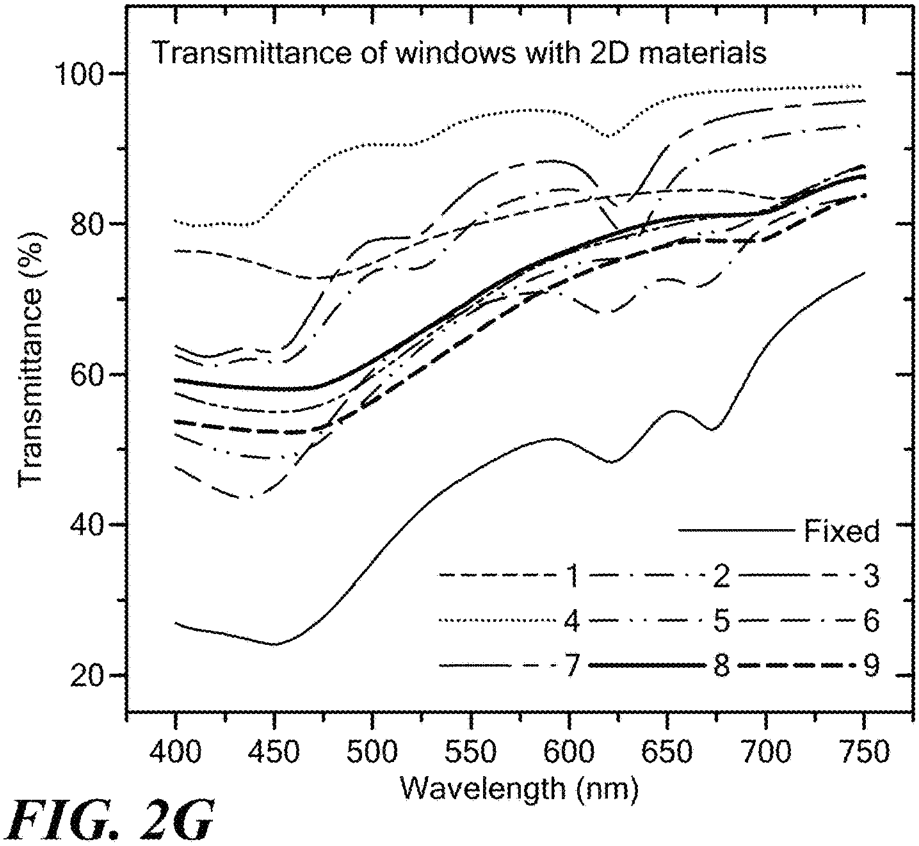
Figure 2H:
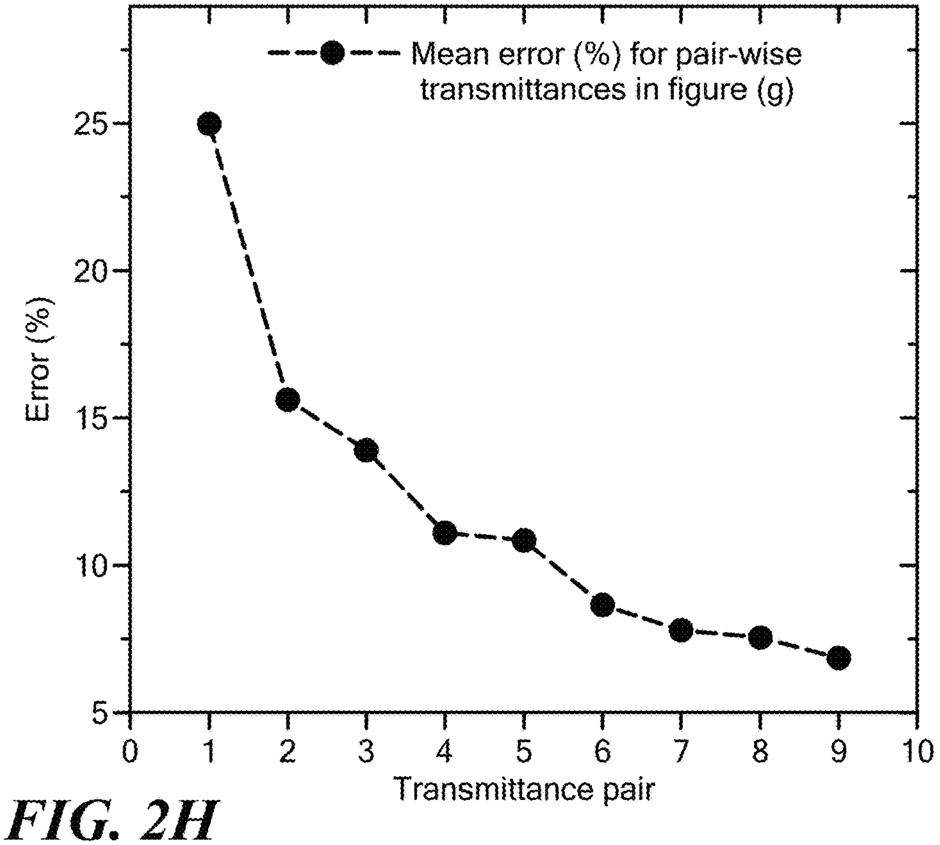

Color estimation efficacy depends on the transmittance variabilities between windows, as this results in more distinct combination of photocurrents for any color. Mathematically it is possible to introduce multiple schemes for variations in Tn(A). To capture some of these variations, high-quality 2D TMDs grown over large area (cm-scale) transparent substrates were prepared using a previously developed vapor-phase chalcogenization (VPC) method (27). The design principles of transmissive windows were guided by simulating transmittance curves with different spectral features that led to reduction of color estimation error. FIG. 2A shows simulated transmittances T=T(A) using linear spectral dependence with increasing slopes, (AT/AX). Past work (32) has shown that multiple-layered growth can result in such changing slopes. FIG. 2B shows the relative change in simulated color estimation when only two such windows are used, with increasing transmittance angles, (0=$\tan^{-1}$(AT/Δλ)). Using windows with large differences in their transmittance slopes led to lower spectral deviation, and hence, designing windows with large transmittance slope ranges was a preferred design principle. Further, the inclusion of distinct excitonic features, which appear as small "transmittance dips" in the spectral transmittance of TMDs, further reduce spectral error. FIG. 2C shows four possible configurations of such simulated dips in two transmittance shapes with otherwise identical slopes. FIG. 2D shows which of these combinations lead to the lowest estimation error. Similar estimations with multiple other configurations (not shown) showed that using windows with multiple such features, which are separated in position, lead to the highest estimation accuracy. Hence, obtaining transmittance windows with a variety of transmittance "dips" at different wavelength positions was a second design principle. FIG. 2E shows a flow-chart describing how these two design principles were integrated into the fabrication of transmissive windows. Multiple synthesis runs were performed on the same sapphire substrate to increase the slope of the transmittance curves, while different TMDs were used to obtain transmittance dips at different characteristic wavelengths. Several such windows were fabricated using four different TMDs ($MX_2$, where M=Mo or W, and X=S or Se). FIG. 2F shows representative light microscope images of different 2D materials grown, including single and multi-layer synthesis. Based on their transmittance features, 12 transmissive windows (10 with 2D materials on them, one containing only a blank sapphire substrate, and one containing only open air) were chosen for building a prototype device, and the transmittances T(A) of windows with 2D materials are plotted in FIG. 2G. FIG. 2H shows the variation of relative color estimation error for various combinations of the 10 windows with 2D materials on them, taken 2 at a time. It was surprising to find that substantial color estimation accuracy could be achieved by using the correct combination of just two windows.

Figure 3A:
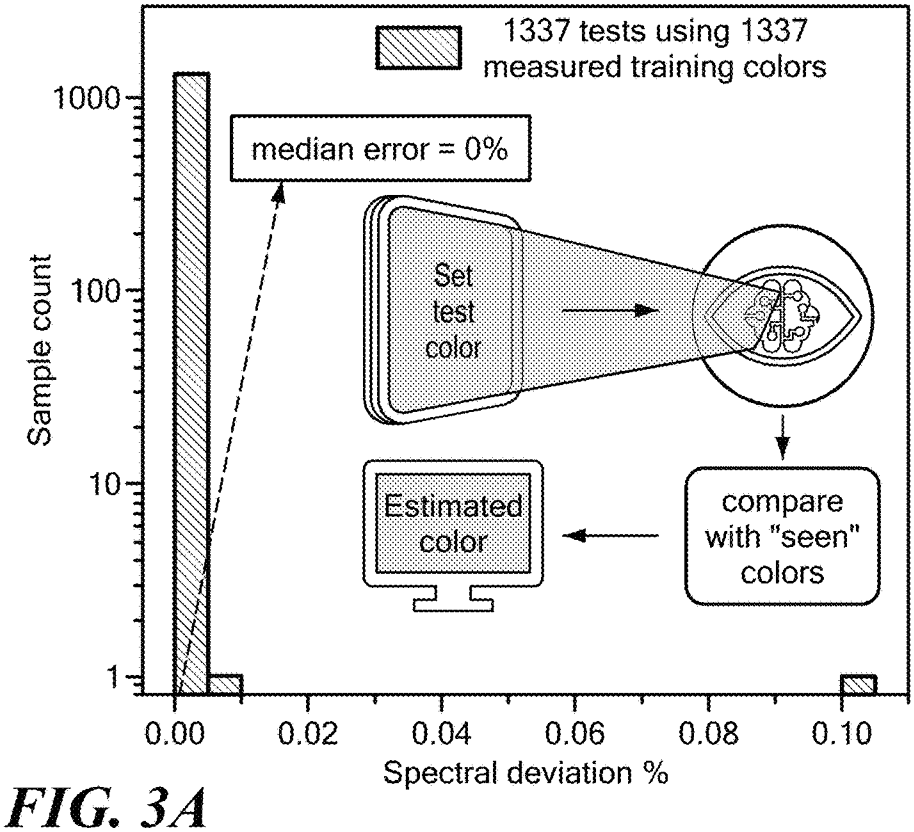
FIGS. 3A-3E show dispersion-free estimation of previously seen colors by a device according to the present technology.
Figure 3B:
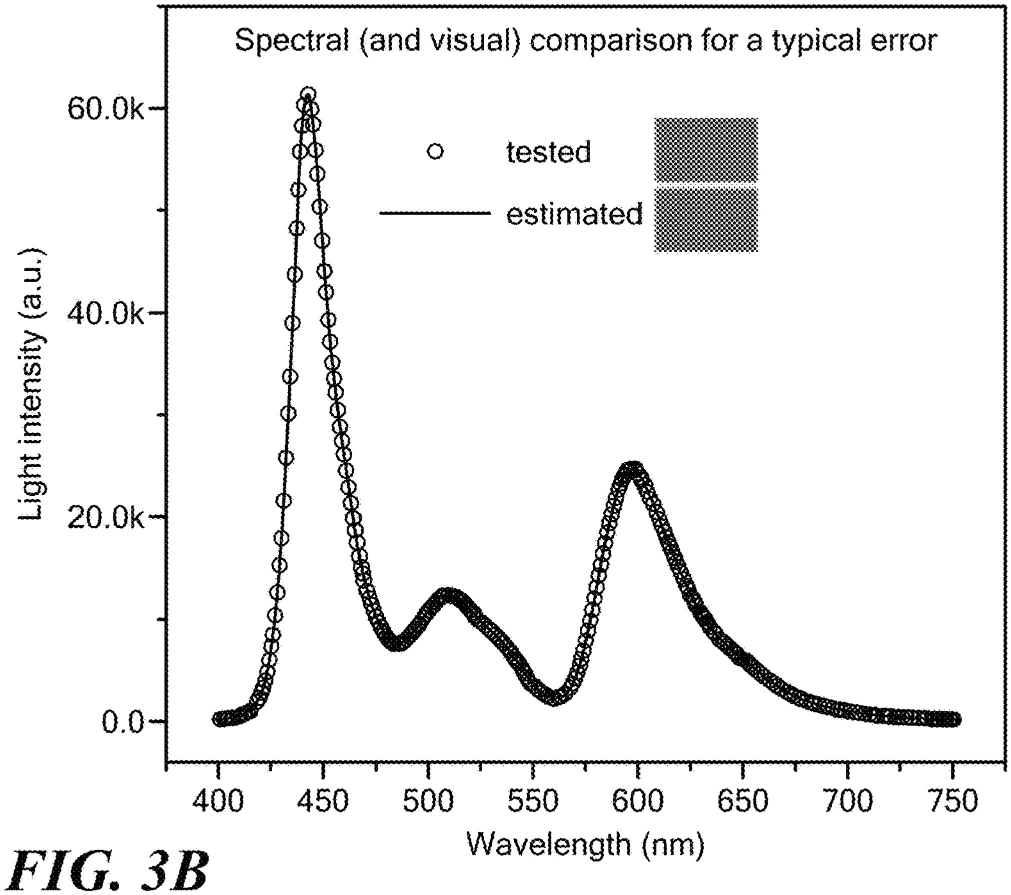
Figure 3C:
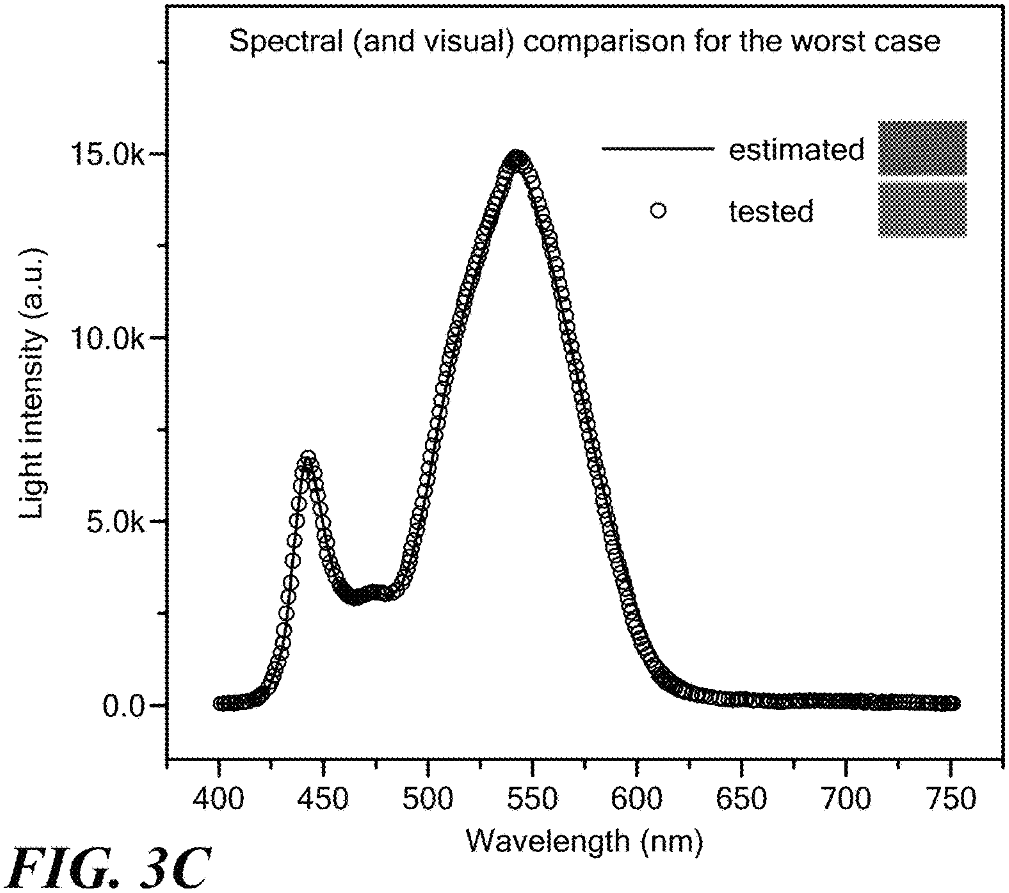
Figure 3D:
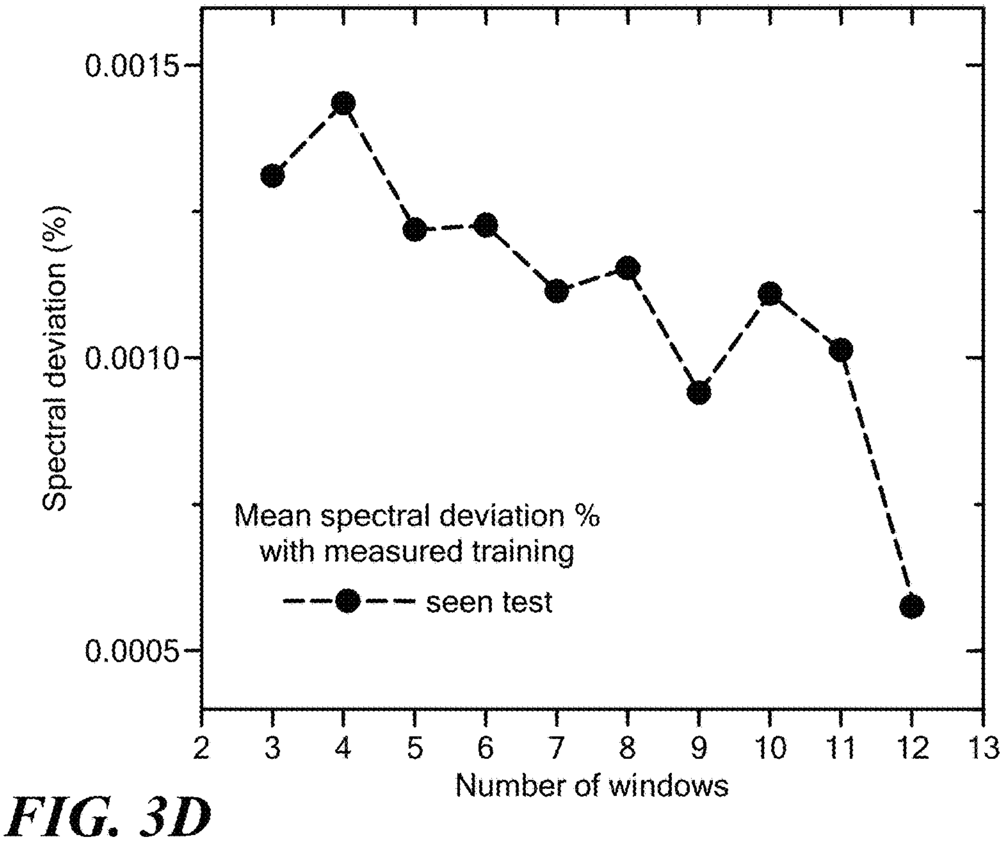
Figure 3E:
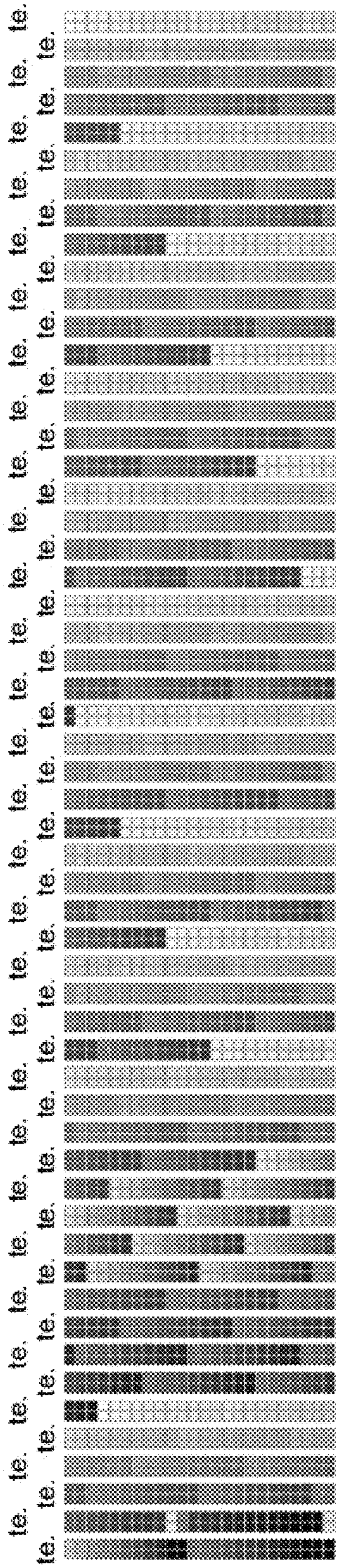

FIG. 3A shows a histogram of "error percentage" calculated for each of the 1337 seen colors estimated when tested again by the trained device. Nearly all colors were estimated with less than 0.001% error (only 2 out of 1337 data points slightly exceeded this error level). FIGS. 3B and 3C show example of how close the spectral estimation was to the actual (expected) spectrum for a typical case with median estimation error vs. the worst-error case, respectively. In both cases, the actual versus estimated colors are shown as rectangular colored boxes. It was observed that both the colors and spectra were reproduced by the device with high accuracy, even in the worst-case scenario, despite any spectral dispersion of the input colors. FIG. 3D shows the variation of spectral error in color estimation as a function of the number of windows used to estimate these colors, for the given noise level. Estimation errors were less than 0.0015% (i.e., color reproduction accuracy exceeded 99.9985%) using as few as 3 windows, whereas errors of 0.0005% or less (i.e., color reproduction accuracy exceeding 99.9995%) could be obtained using 12 windows. FIG. 3E shows the actual versus estimated colors for all 1337 RGB values, highlighting the near-flawless dispersion-free recognition of "seen" colors with the present technology.

Figure 4A:
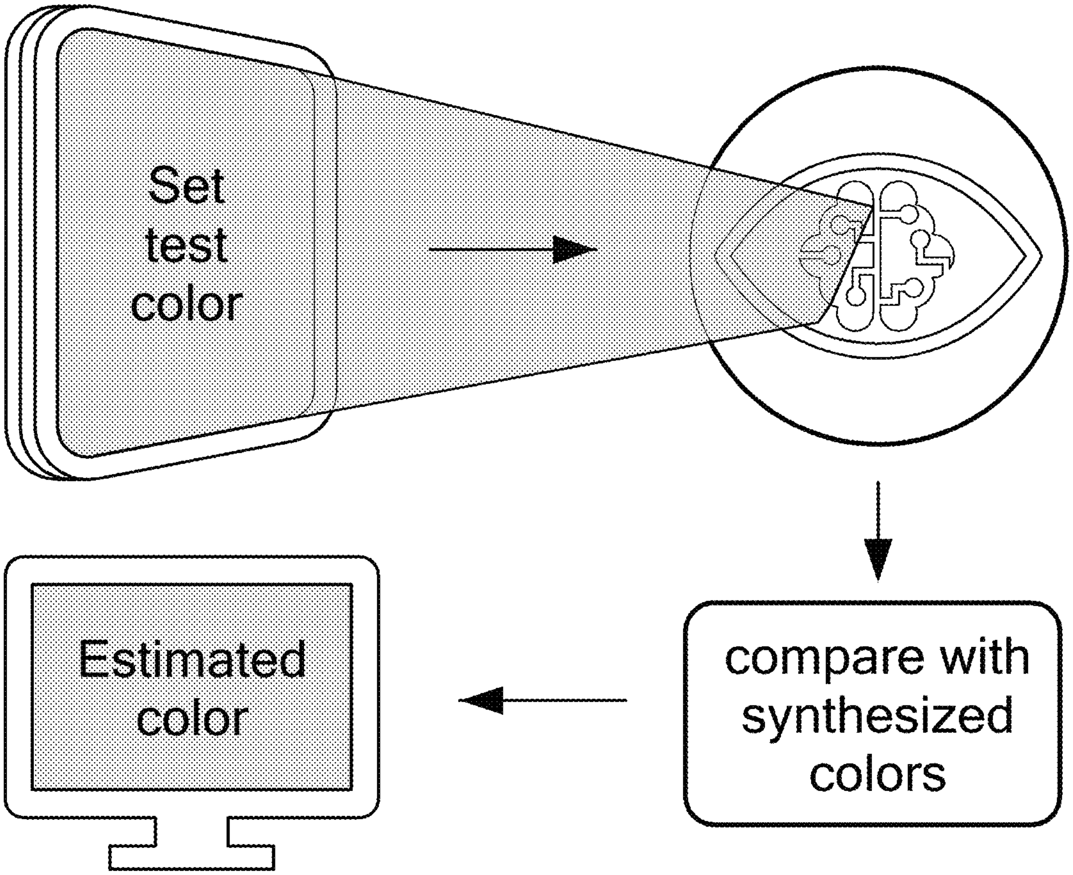
FIGS. 4A-4F show results of dispersion-free estimation of previously unseen colors.
Figure 4B:
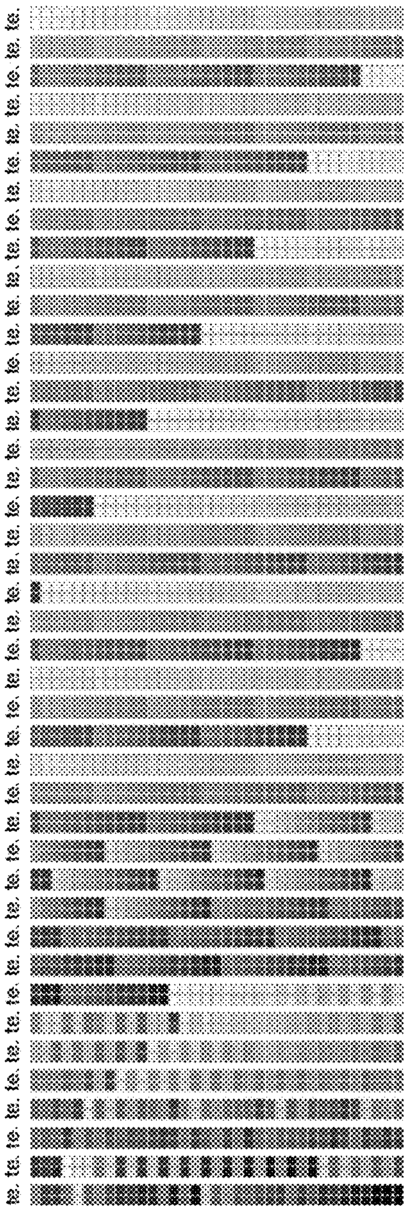
Figure 4C:
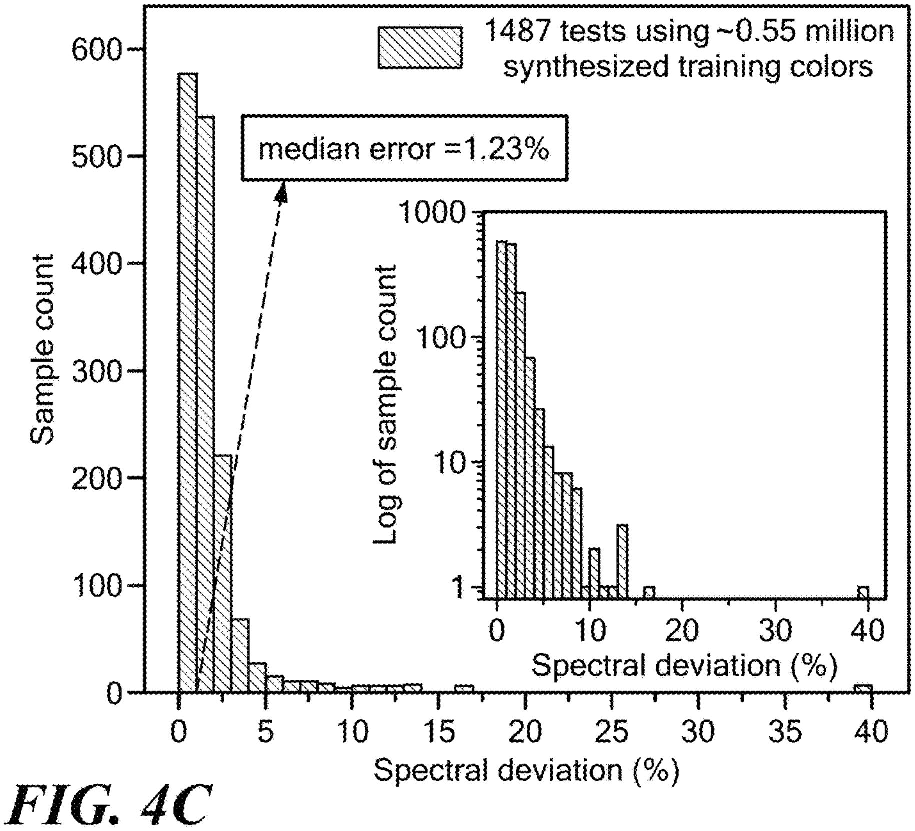
Figure 4D:
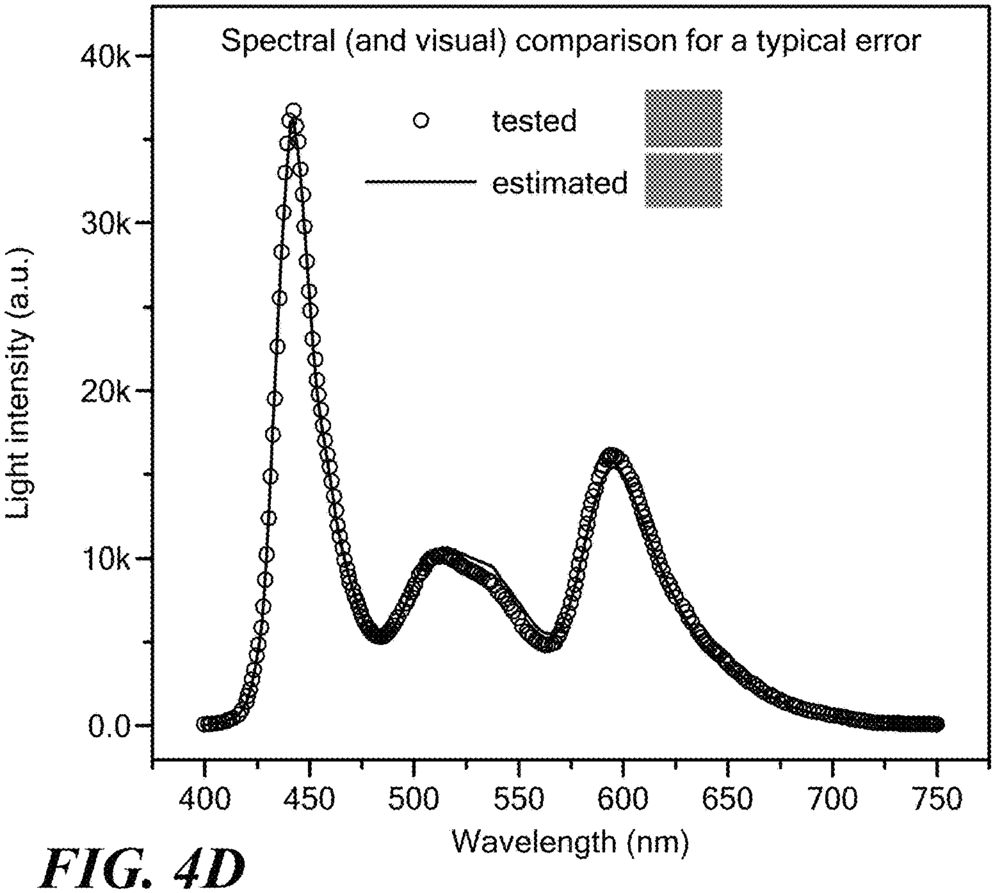
Figure 4E:
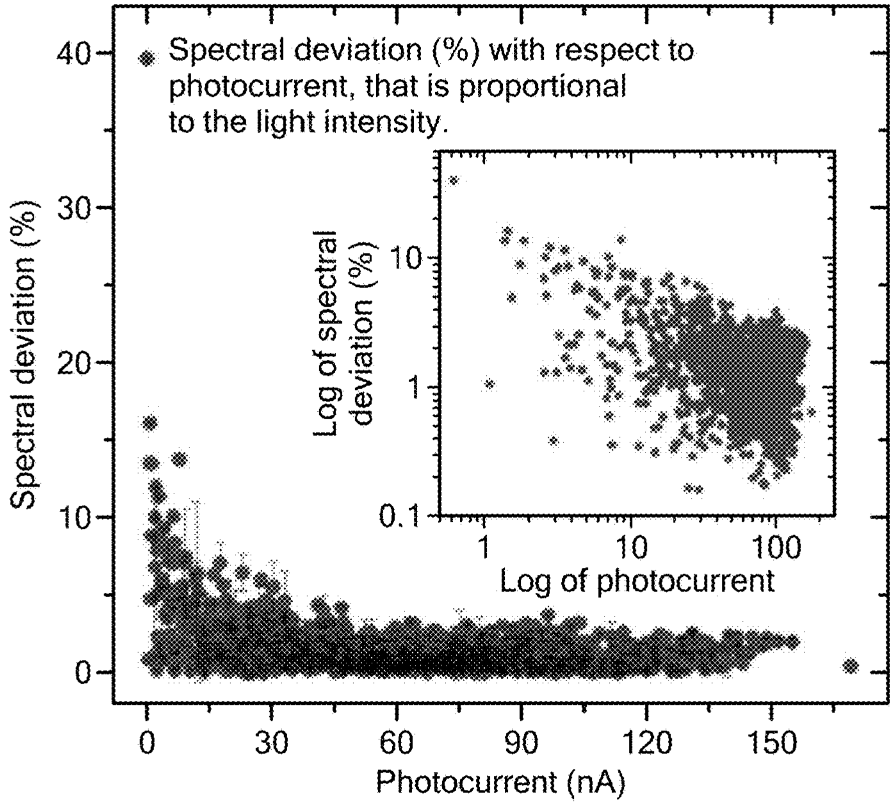

Digital images can possess up to 256×256×256–16.8 million RGB values, and training the device with so many "seen" colors is impractical. For practical estimation beyond "seen" colors, the device was trained using an arbitrary number of synthesized colors. For demonstration purposes, the photocurrents and spectra for 0.55 million combinations of RGB values, each ranging from 60-255, were synthesized in steps of $\Delta$=5 and used as the training database. FIG. 4B presents a visual comparison between the actual versus estimated colors for all 1487 RGB values, highlighting the accurate dispersion-free recognition of "seen" colors by the device. FIG. 4C shows a histogram of spectral errors in estimating 1487 test colors (whose RGB values spanned the entire set of 0.55 million synthesized colors). Very little difference was found between real (measured) spectra and the ones predicted by the device (when estimated using the unseen synthesized training set on the measured photocurrents), as evident from the remarkably low median error (1.23%) in these tested colors. FIG. 4D shows how closely the spectrum of an estimated color matched the spectrum of the test color, representing the median error value, with the inset color boxes providing a visual reproduction of this color, with the maximum deviation occurring at the weakest "peak" structure between $\lambda$~500-550 nm. Investigations showed that the dominant source of error was low-light conditions that resulted in low photocurrent signals, as they began to approach the photodetector noise floor. See FIG. 4E. Thus, more sensitive photodetectors with lower noise floors will lead to even higher color estimation efficacy, especially for low-intensity light.

Figure 4F:
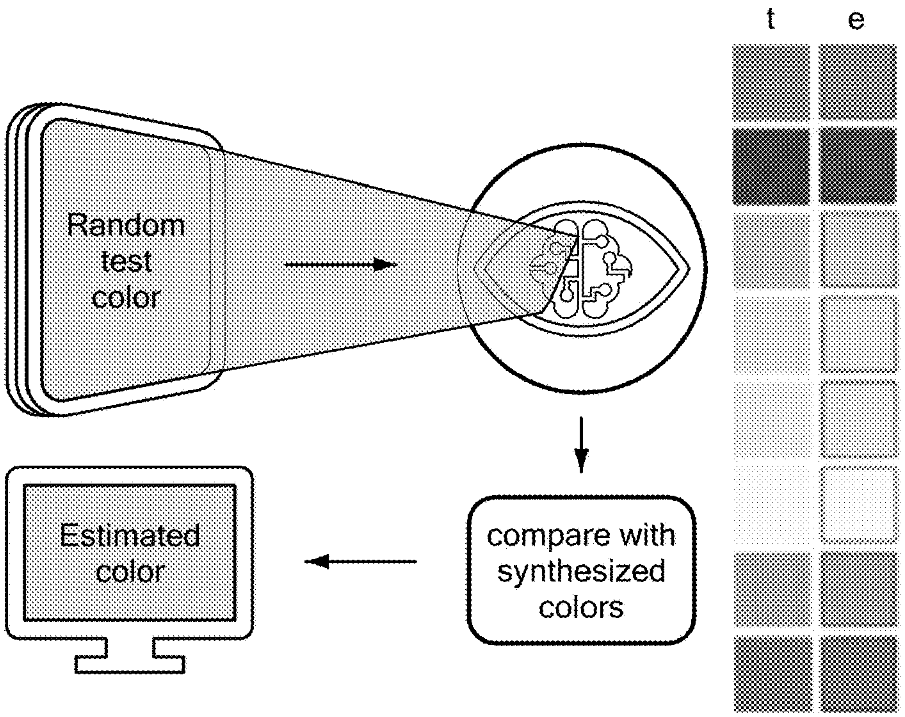

The trained device was tested for proximal color identification, i.e., testing using random colors that were not part of the training set (referred to as "unknown" colors, not present in the "seen" or "simulated" sets) by matching the unknown colors with the nearest ones in its library. FIG. 4F compares eight expected versus estimated colors (matched to a nearest "seen" color). The device was able to identify an unknown color with close proximity to a synthesized color, and without the need for any dispersion. This feature makes the technology attractive for many machine vision applications, including industrial monitoring and color-based sorting, autonomous vehicles, and robotics, as well as chemical/biological investigations and diagnostic tools that utilize fluorescence for distinction, diagnosis, and other color-based decision-enabling operations.

Figure 4G:
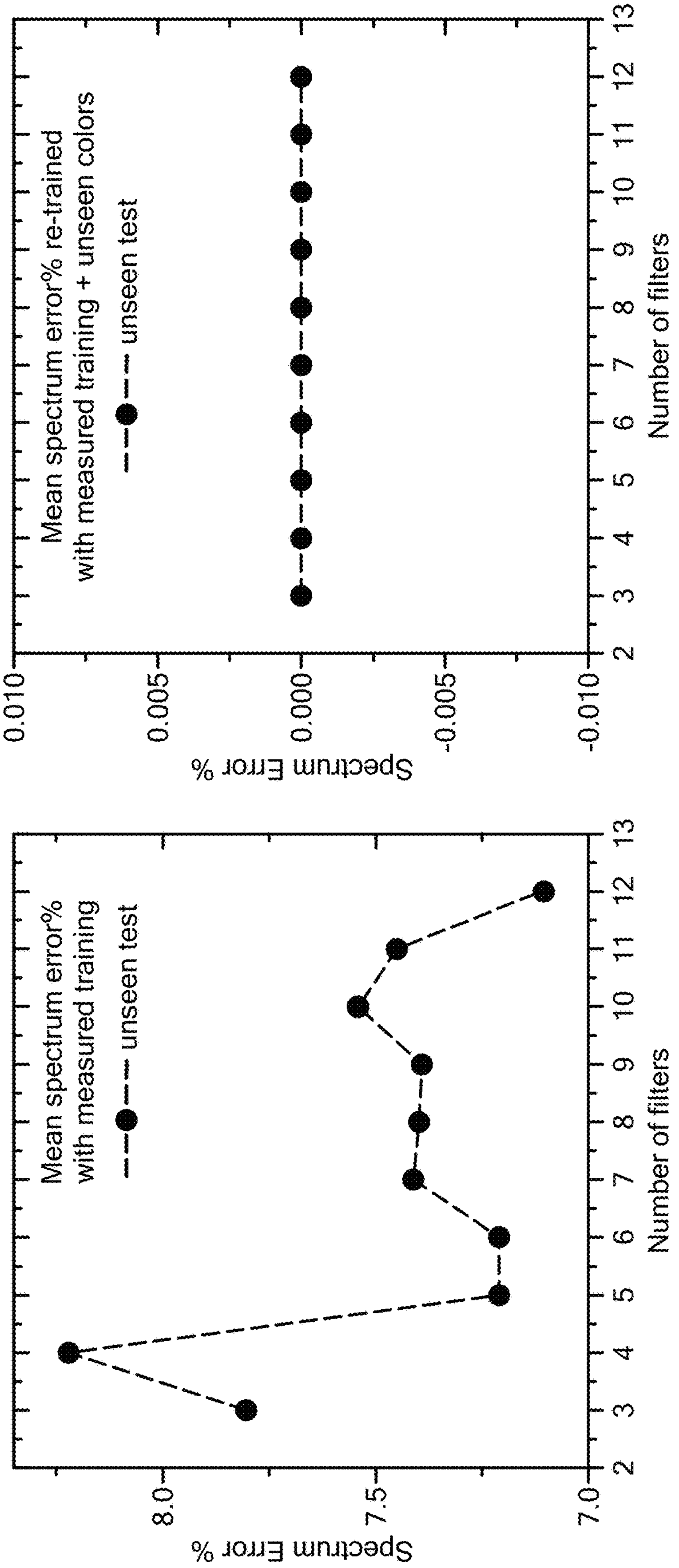
FIG. 4G shows results that demonstrate that the system can learn and improve through use. The spectral deviation of unseen test colors using different numbers of filters, when only the seen colors are used for training, is shown at left. After adding the unseen colors to the collection of seen colors and training the system again, the spectral deviation of previously unseen colors becomes near zero, just like the rest of the seen colors (right).

Another attractive aspect of the present technology is that the device can continuously learn when corrected, i.e., when the RGB values of a tested color are included into its database. FIG. 4G shows how well the trained device can estimate the same colors after it has been re-trained after the first test, with its spectral estimation error approaching near-zero values. The left panel of FIG. 4G shows the spectral deviation in estimating test samples that were not seen before, when estimation is done by comparing the unseen test samples to the seen training samples. As expected, the error is somewhat higher than the case with "seen" tests in FIG. 3A. After retraining the model by adding the newly collected unseen colors to the seen colors collected earlier, it is possible to reduce the estimation error again for the new colors. After the model has been re-trained with these additional colors, its mean spectral deviation error approaches near-zero values, as shown in FIG. 4G at the right.

EXAMPLES

Example 1. 2D-Material Fabrication Via Vapor-Pphase Chalcogenization (VPC)

Four different transition metal dichalcogenides (TMDs) were chosen that have distinct absorption features in the visible range of electromagnetic spectrum and in 2D form manifest steepest transmittance curves. These four TMDs are the following: molybdenum disulfide ($MoS_2$), molybdenum diselenide ($MoSe_2$), tungsten disulfide ($WS_2$), and tungsten diselenide ($WSe_2$). Using the VPC technique, 2D structures of these four TMDs and their heterostructures were fabricated on double-side polished (dsp) sapphire substrates of 7 mm length. Over 30 different combinations of these TMDs were fabricated; then, after examining their transmittance spectra, 14 TWs were initially selected. Using a TW-selection algorithm, 10 out of the initial 14 TWs were selected as performing the best in estimating color/spectrum; these were installed in the daisy wheel filter holder using glue, and leaving a uniformly sized circular area for the light beam to pass.

Unlike chemical vapor deposition (CVD), VPC is a single-step chemical reaction process, where two or more precursors, here TMDs, chemically react in vapor phase and condensate on a substrate. The growth temperature is usually different from the melting point of the precursors. In the case of $MoS_2$, the growth temperature is about 720° C. to grow on $Si/SiO_2$, and closer to about 800° C. to grow on sapphire. Sulfur powder starts to melt close to 150° C., while the molybdenum melts at much higher temperatures (above 2600° C.). However, the melting point is not needed to achieve a chemical reaction. To synthesize 2D-TMDs via VPC, the distance of the two precursors from the substrate must be adjusted, the ramp and growth temperatures need to be controlled, and the carrier gas flowrate as well as the time for each growth run need to be adjusted. For these four materials, the sapphire substrate was placed directly on the molybdenum or tungsten powder, and together they were placed in a crucible inside the tube at the center of the furnace. The sulfur or selenium powder was placed on the edge of furnace, in an upstream direction, close enough to the furnace so that it could slowly melt as the furnace temperature was ramped up. Only two precursors were used for each growth run. When sulfur was used in the growth, only helium was used as carrier gas, but when selenium was used, a small flow of hydrogen was added. In each growth, air was first pumped out from the growth tube, which was then backfilled with carrier gas. Afterwards, with a constant flowrate and atmospheric pressure, the growth medium was heated.

The temperature was ramped up as fast as possible from room temperature to a starting point, such as about 600° C., then gradually increased by steps of 5° C./min, up to the growth temperature, where the samples were held for about 20-30 min. In some growth runs, the temperature was ramped up directly from room temperature to the final temperature and kept at that temperature for about 20 min. When the intended growth time was over, the heat was turned off and the tube was cooled down with a fan while allowing the carrier gas to flow. The tube was only opened to air when it was cooled down to room temperature. To grow heterostructures, a pre-grown substrate, i.e., with a layer of 2D TMD on it, was placed in another furnace, and growth of a different TMD was performed. As another variation, thicker layers of TMDs or layers covering larger areas were grown using higher temperatures or longer growth times.

All sapphire substrates were squares of 7 mm on a side. To grow $MoS_2$ on sapphire, one set of parameters was the following: 0.5 mg $MoO_3$, 0.6 g sulfur (S), He flowrate=150 sccm, temperature ramped from room temperature to 550° C. as fast as possible, then from 550° C. to 720° C. at 5° C./min, and growth time of 20 min; no $H_2$ gas was used for $MoS_2$. To grow $MoSe_2$, one set of parameters was as the following: 0.5 mg $MoO_3$, 0.6 g selenium (Se), He flowrate=150 sccm, $H_2$ flowrate=2 sccm, temperature ramped from room temperature to 600° C. as fast as possible, then from 600° C. to 800° C. at 5° C./min, and growth time of 20 min. The mass of precursors and carrier-gas flowrates were kept constant in all growth runs, but the growth time and temperature were modified to obtain some TMD samples.

Example 2. Construction of Data Acquisition System

Figure 5A:
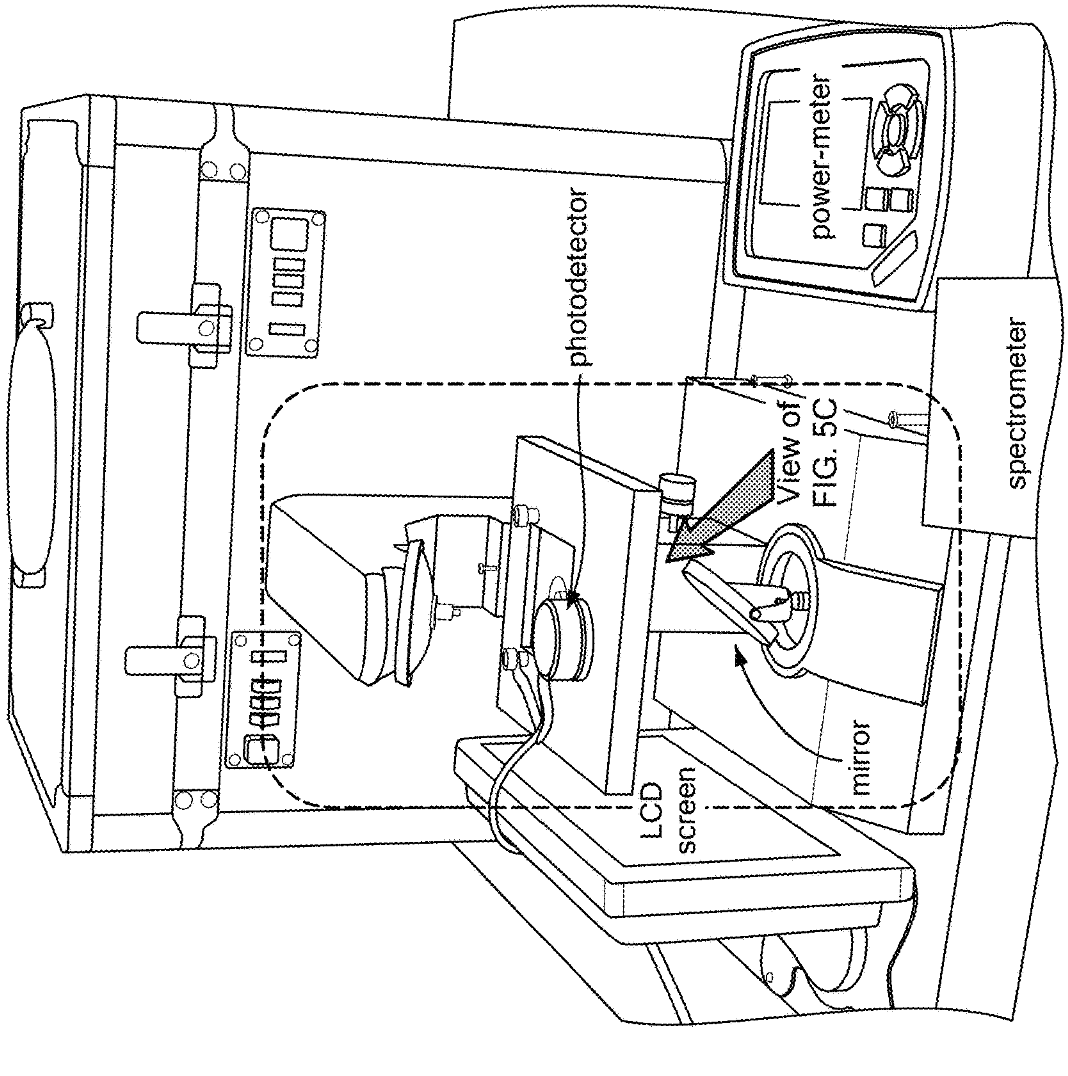
FIGS. 5A-5C show photographs of a device for testing a set of 12 TMD transmission windows and methods of the present technology.
Figure 5B:
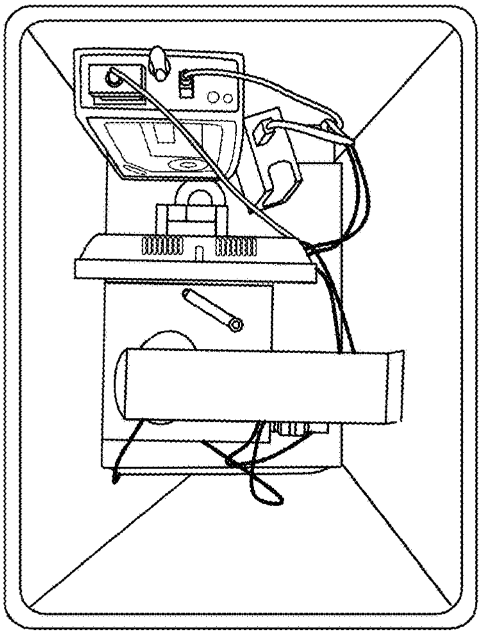
Figure 5C:
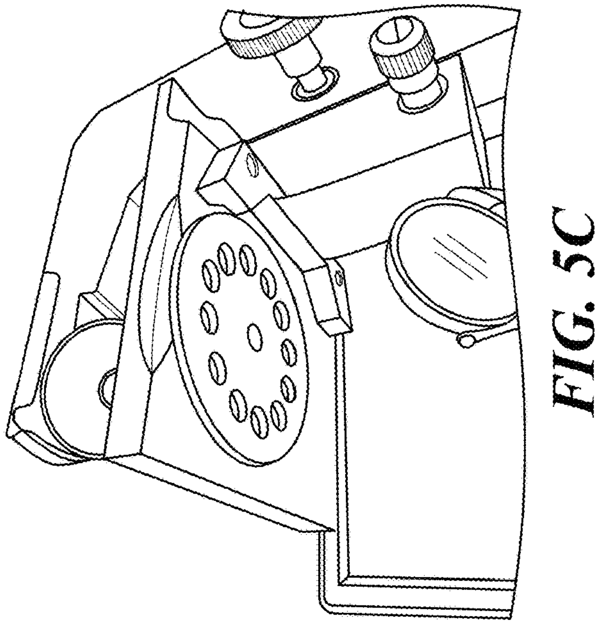

An old inverted microscope was modified (enclosed by the dashed line in FIG. 5A) by removing its lenses and paining it black. The transmission windows (TWs) were placed in their corresponding positions in the TW holder and fixed in place with glue. The TW holder was then mounted beneath the microscope stage such that the holder could be rotated to allow a desired TW into the light path. The photodetector (S120VC from Thorlabs) was placed on top of the opening in the microscope state that was designed in the light path of the microscope. By rotating the sample holder along its plane, the TWs were placed, one by one, into the beam path. The mirror of the microscope, beneath the stage, helped focus the light coming from the LCD screen (Loncevon 7 inch portable small HDMI LCD monitor) onto the TW that was located under the photodetector. FIG. S20*c* shows the microscope body from below, showing the location of the sample holder. In FIG. S20*a* we also show the LCD screen in its correct place; however, the spectrometer and power meter are placed at arbitrary locations in the figure for the purpose of presentation. The photodetector was connected to the power-meter. When all these components were placed inside the box (with black interior), the screen, spectrometer, and power meter were wired into the computer. The power meter and its software were used to collect the photocurrent in nanoamps, not the power value.

Example 3. Data Collection

All measurements were performed while all components were inside the sealed black box. First, the LCD display was turned on and allowed to stabilize for about 30 minutes, to allow its pixels reach thermal equilibrium. The LCD was connected to the computer as secondary monitor, and the colors created by custom software were projected on this secondary screen. The rest of the programs were opened on the main monitor of the computer, without affecting the LCD screen inside the tool black box. In particular, "SpectraSuite" and "Optical Power Meter Utility" were used to read the data from spectrometer and power meter, respectively. When measuring the truth spectrum for each color using the spectrometer, the SpectraSuite software was set to average every 10 measurements, and the spectrum every 40 msec. To smooth the curves, the boxcar width was set to 10. The electronic setting of the spectrometer was set to "dark". We note that we allow the light to pass from the air, i.e., T1. Considering that the screen was turned on 3 sec for each color and 2 sec off in between, tens of spectra were collected per color, and over 50,000 spectra in total. Spectra of each color at its maximum brightness were selected for analysis, yielding about 20 spectra per RGB color. The average spectrum for each color was calculated and stored. The standard deviation of each spectrum at each wavelength and at each color was calculated and stored.

When measuring the truth spectrum for the RGB colors was done, the spectrometer was removed from the light path and replaced with the photodetector; the TWs were then placed one by one into the beam path. The PCs for all colors were collected for one TW, and then the TW was changed and the PC measurements for all colors repeated. When one TW was set in the beam path, the amps setting of the "Optical Power Meter Utility" software was used, and the settings adjusted to average every 100 samples and collect at time intervals of 0.01 sec. This way, over 30 readings were obtained per color. Only the data collected when the LCD was at its fullest brightness for each color were used to calculate the average and standard deviation for each color. When the measurement of PC for 1337 colors for one TW was complete, the next TW was brought into the light path, and the measurements were performed again.

Example 4. Machine Learning for RGB and Spectrum Estimation

In the present technology, the transmittance curves, color perceptions, and optical spectra are main physical components that are deciding factors in the estimation, from the machine learning perspective, however, more stringent definitions are required for "input features" and "output values". It is assumed that the problem is a classification problem, i.e., each color is a class or category, and based on input features of an incident light, the machine learning model decides to which one of the classes (Class)i, i=1, 2, . . . , M the incident color belongs; M is the number of total classes (colors) in the training set. The inventors believe the problem can also be approached and solved as a "regression" problem, but that approach requires extended work in deep learning.

The photodetector current (PC) values were chosen as input values. For each incident light, a PC was measured from each transmission window (TW), or filter, making N-PC values for a light. In short, for an incident light into the system, N-PC values were collected and the color labeled i; the same is done for the rest of M different colors that were used for training. Assume that for each color i, there is only one N-PC set. In this case the training set for the present classification problem consists of an input matrix with dimensions of M×N, and label vector of length M. If we collect more than one set of N-PC for each color, then the total number of training samples will be more than the number of classes M (in the experiments described herein, there were M×10 training samples). Each class i has a corresponding spectrum Si and color represented by [R, G, B]i that are either stored in the hardware memory, or can be regenerated if the class number i comes up in the estimation. For initial estimation, the spectra are stored in the memory, but spectra can be output without storing any. The latter approach avoids occupying a large amount of memory space.

Estimation was performed by an instance-based k nearest neighbor algorithm, which is the standard kNN approach, in which a new case is classified by a majority vote of its neighbors, with the case being assigned to a class that is most common among its k nearest neighbors measured by a distance function (33). If k is 1, then the case is simply assigned to the class of its nearest neighbor. There are various kinds of distance functions, but here a Euclidean distance function was applied, which is the classical presentation of distance and is given by $df(X, Y)=\sqrt{(x_i-y_i)^2}$. Here, X refers to each sample in the training set and Y refers to the unknown (test) sample. To apply it to data, a distance needs to be found of a new transmittance vector of N-PC elements, NPC, NPC'={$pc'_1$, . . . $pc'_N$}, with all known N-PC vectors NPC=[$pc_1$, . . . $pc_N$} that are already known and in the training set, so the distance function is $$df(NPC, NPC') = \sqrt{\sum_{j=1}^{N}(pc_j - pc'_j)^2}$$

The distance between NPC' and all M training NPC samples is calculated, and the M calculated distance values are sorted from smallest to largest using a typical sorting algorithm. Afterwards, the k nearest neighbors, i.e., wavelengths that have smallest distance values from the test NPC' are found, which are the arguments of the first k numbers of the sorted list. Each nearest neighbor is assigned a uniform weight of 1/k, and the k neighbors are classified. Then, the test case NPC' is assigned to the group with largest vote or population. The average error of estimating the entire test samples using synthesized training set was plotted against the k value (not shown). Based on this result, k=1, i.e., the closest neighbor of the test vector NPC', turned out to be most accurate. The output of kNN here is a single number, which is index i of the color in the range i=1, . . . , M.

Example 5. Training and Using the Nearest Neighbor Model

The photocurrent (PC) values are the so called "features" of the model, and the outputs are the labels that the model is trained with. In the present kNN model, a label is the color index given to each light sample. By knowing the color index, its RGB values are known—if measured by a color detector, and its spectrum, if measured by a spectrometer. The steps taken to train the model (device) and then use it for color estimation were as follows.

1. Generate large number of various colors by varying R, G and B values in a for-loop and projecting the light from an LCD screen onto the transmission windows (TWs) and then the transmitted light onto the photodetector. Label each training color by number.
2. Collect the photocurrents (N-PC for each color, corresponding to N-TWs) for all generated/projected light beams using the photodetector and ammeter. In the present experiments, the amp-collection capability of a PM 100 Thorlabs optical power-meter was used, i.e., the power meter was used in PC mode in the PM 100 software. Even through used as a power meter, the "power" is neither needed nor measured, which means no wavelength setting on the power-meter was used.
3. Collect the spectrum of each color using an Ocean optics spectrometer. The collected spectrum then becomes the "truth value spectrum".
4. Create another set of colors as a test set, both from the same RGB values in the training set and RGB values that were not part of the training set and collected their respective photocurrents.
5. Apply model (such as kNN) to obtain the color label (i.e., "class") that each of the test samples belongs to. When the nearest neighbor class is identified, the problem is solved because the label provides the information about RGB values of the color and its spectrum, which are stored in the memory. If desired, the "estimated" color can be projected on the screen, as well as the RGB values and spectrum (intensity as a function of wavelength) of the tested light.

Example 6. Definition of Estimation Error

Each color with index i (in the range i=1, M) was generated by setting RGB values to [R, G, B]i; the respective truth spectrum of each color was measured using a spectrometer, and labeled as Si. When the kNN algorithm estimates index i (or class i), it automatically directs to the [R, G, B]i and Si pair. That said, by finding out to which class the test sample belongs, the estimated RGB values and estimated spectrum of that light or color are immediately known. Since the spectrum has more information about the light than the RGB values, only the spectral estimation efficacy is presented herein.

RMSE error calculation is presented below. Consider the visible range of 400 nm-750 nm, and assume that the spectrum $S_l$ has been collected by fixed intervals such that the visible range has been wedged by L equally spaced wavelengths. Here, the spectrum has been measured by intervals of 1 nm, and L=351 is the number of wavelengths with interval of 1 nm in the visible range; so $$S = S(\lambda_l),\ l = 1, 2, \ldots, L.$$

If the estimated spectrum is presented by $S^l$ and the expected spectrum by S (or $S_l$ to be exact), then error at each individual wavelength is defined as the following $$\delta S_l = S_l - S_l'$$

For simplicity of notation, index i is omitted here, but it will added back later. The $\delta S_l$ for each wavelength is divided by the maximum value, i.e., peak of the spectrum, to obtain the relative error as below.

$$\delta_l = \frac{\delta S_l}{\max(S)}$$

As a result, the error percent in estimating a test spectrum Si over the entire visible range is:

$$\Delta_i = \sqrt{\frac{1}{L}\sum_{l=1}^{L}\delta_l^2} \times 100$$

The index i is to enumerate a spectral deviation $\Delta i$ for each test spectrum Si. All histograms shown herein are plots of individual $\Delta i$'s for each color class. If there are m test samples, the average error percent in estimating all test samples will be:

$$\Delta = \frac{1}{m}\sum_{i=1}^{m}\Delta_i$$

or in short, the average error % in estimating the spectrum of all test samples is:

$$\Delta = \frac{1}{m}\sum_{i=1}^{m}\sqrt{\frac{1}{L}\sum_{l=1}^{L}\left(\frac{S_l - S_l'}{\max(S_i)}\right)^2} \times 100$$

For a set of transmittance windows (TWs), the error $\Delta$ represents the overall average percent of error that is seen on the entire test set, if these TWs are used to estimate spectrum. All error plots in FIGS. 2B, 2D, and 2H show $\Delta$ for various TW choices.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

REFERENCES (1) Jacobs, G. H. Evolution of Colour Vision in Mammals. Philos Trans R Soc Lond B Biol Sci 2009, 364 (1531), 2957-2967. doi.org/10.1098/rstb.2009.0039.
(2) Solomon, S. G.; Lennie, P. The Machinery of Colour Vision. Nat Rev Neurosci 2007, 8 (4), 276-286. doi.org/10.1038/nrn2094.
(3) Witzel, C.; Gegenfurtner, K. R. Color Perception: Objects, Constancy, and Categories. Annual Review of Vision Science 2018, 4 (1), 475-499. doi.org/10.1146/annurev-vision-091517-034231.
(4) Deslippe, J.; Samsonidze, G.; Strubbe, D. A.; Jain, M.; Cohen, M. L.; Louie, S. G. BerkeleyGW: A Massively Parallel Computer Package for the Calculation of the Quasiparticle and Optical Properties of Materials and Nanostructures. Computer Physics Communications 2012, 183 (6), 1269-1289. doi.org/10.1016/j.cpc.2011.12.006.
(5) Ding, Y.; Hua, L.; Li, S. Research on Computer Vision Enhancement in Intelligent Robot Based on Machine Learning and Deep Learning. Neural Comput & Applic 2021. doi.org/10.1007/s00521-021-05898-8.
(6) Bramão, I.; Reis, A.; Petersson, K. M.; Faisca, L. The Role of Color Information on Object Recognition: A Review and Meta-Analysis. Acta Psychologica 2011, 138 (1), 244-253. doi.org/10.1016/j.actpsy.2011.06.010.
(7) Blancon, J.-C.; Tsai, H.; Nie, W.; Stoumpos, C. C.; Pedesseau, L.; Katan, C.; Kepenekian, M.; Soe, C. M. M.; Appavoo, K.; Sfeir, M. Y.; Tretiak, S.; Ajayan, P. M.; Kanatzidis, M. G.; Even, J.; Crochet, J. J.; Mohite, A. D. Extremely Efficient Internal Exciton Dissociation through Edge States in Layered 2D Perovskites. Science 2017, eaal4211.
(8) Finlayson, G. D. Colour and Illumination in Computer Vision. Interface Focus 2018, 8 (4), 20180008. doi.org/10.1098/rsfs.2018.0008.
(9) Esteva, A.; Chou, K.; Yeung, S.; Naik, N.; Madani, A.; Mottaghi, A.; Liu, Y.; Topol, E.; Dean, J.; Socher, R. Deep Learning-Enabled Medical Computer Vision. npj Digital Medicine 2021, 4 (1), 1— 9. doi.org/10.1038/s41746-020-00376-2.
(10) Tomikj, N.; Kulakov, A. Vehicle Detection with HOG and Linear SVM: Vehicle Detection with HOG and Linear SVM. ject 2021, 1 (1), 6-9.
(11) Jain, A.; Pradhan, B. K.; Mahapatra, P.; Ray, S. S.; Chakravarty, S.; Pal, K. Development of a Low-Cost Food Color Monitoring System. Color Research & Application 2021, 46 (2), 430-445. doi.org/10.1002/col.22577.
(12) Cubero, S.; Aleixos, N.; Moltó, E.; Gómez-Sanchis, J.; Blasco, J. Advances in Machine Vision Applications for Automatic Inspection and Quality Evaluation of Fruits and Vegetables. Food Bioprocess Technol 2011, 4 (4), 487-504. doi.org/10.1007/s11947-010-0411-8.
(13) Wan, P.; Toudeshki, A.; Tan, H.; Ehsani, R. A Methodology for Fresh Tomato Maturity Detection Using Computer Vision. Computers and Electronics in Agriculture 2018, 146, 43-50. doi.org/10.1016/j.compag.2018.01.011.
(14) Swetha, R. K.; Chakraborty, S. Combination of Soil Texture with Nix Color Sensor Can Improve Soil Organic Carbon Prediction. Geoderma 2021, 382, 114775. doi.org/10.1016/j.geoderma.2020.114775.
(15) Loisel, H.; Vantrepotte, V.; Ouillon, S.; Ngoc, D. D.; Herrmann, M.; Tran, V.; Mériaux, X.; Dessailly, D.; Jamet, C.; Duhaut, T.; Nguyen, H. H.; Van Nguyen, T. Assessment and Analysis of the Chlorophyll-a Concentration Variability over the Vietnamese Coastal Waters from the MERIS Ocean Color Sensor (2002-2012). Remote Sensing of Environment 2017, 190, 217-232. doi.org/10.1016/j.rse.2016.12.016.
(16) Sabela, M.; Balme, S.; Bechelany, M.; Janot, J.-M.; Bisetty, K. A Review of Gold and Silver Nanoparticle-Based Colorimetric Sensing Assays. Advanced Engineering Materials 2017, 19 (12), 1700270. doi.org/10.1002/adem.201700270.
(17) Sun, Q.; Cao, M.; Zhang, X.; Wang, M.; Ma, Y.; Wang, J. A Simple and Low-Cost Paper-Based Colorimetric Method for Detecting and Distinguishing the GII.4 and GII.17 Genotypes of Norovirus. Talanta 2021, 225, 121978. doi.org/10.1016/j.talanta.2020.121978.
(18) Shrivastav, A. M.; Cvelbar, U.; Abdulhalim, 1. A Comprehensive Review on Plasmonic-Based Biosensors Used in Viral Diagnostics. Communications Biology 2021, 4 (1), 1-12. doi.org/10.1038/s42003-020-01615-8.
(19) Singh, R.; Mehra, R.; Walia, A.; Gupta, S.; Chawla, P.; kumar, H.; Thakur, A.; Kaushik, R.; Kumar, N. Colorimetric Sensing Approaches Based on Silver Nanoparticles Aggregation for Determination of Toxic Metal Ions in Water Sample: A Review. International Journal of Environmental Analytical Chemistry 2021, 0 (0), 1-16. doi.org/10.1080/03067319.2021.1873315.
(20) Badano, A.; Revie, C.; Casertano, A.; Cheng, W.-C.; Green, P.; Kimpe, T.; Krupinski, E.; Sisson, C.; Skrøvseth, S.; Treanor, D.; Boynton, P.; Clunie, D.; Flynn, M. J.; Heki, T.; Hewitt, S.; Homma, H.; Masia, A.; Matsui, T.;

Nagy, B.; Nishibori, M.; Penczek, J.; Schopf, T.; Yagi, Y.; Yokoi, H. Consistency and Standardization of Color in Medical Imaging: A Consensus Report. J Digit Imaging 2015, 28 (1), 41-52. doi.org/10.1007/s10278-014-9721-0.

(21) James Clerk Maxwell Produces the First Color Photograph: History of Information https://www.historyofinformation.com/detail.php?id=3666 (accessed 2021-06-04).

(22) Hejazi, D.; Liu, S.; Ostadabbas, S.; Kar, S. Transition Metal Dichalcogenide Thin Films for Precise Optical Wavelength Estimation Using Bayesian Inference. ACS Appl. Nano Mater. 2019, 2 (7), 4075-4084. doi.org/10.1021/acsanm.9b00489.

(23) Hejazi, D.; Liu, S.; Farnoosh, A.; Ostadabbas, S.; Kar, S. Development of Use-Specific High-Performance Cyber-Nanomaterial Optical Detectors by Effective Choice of Machine Learning Algorithms. Mach. Learn.: Sci. Technol. 2020, 1 (2), 025007. doi.org/10.1088/2632-2153/ab8967.

(24) Chernikov, A.; Berkelbach, T. C.; Hill, H. M.; Rigosi, A.; Li, Y.; Asian, 0. B.; Reichman, D. R.; Hybertsen, M. S.; Heinz, T. F. Exciton Binding Energy and Nonhydrogenic Rydberg Series in Monolayer WS 2. Physical review letters 2014, 113 (7), 076802.

(25) Mak, K. F.; He, K.; Lee, C.; Lee, G. H.; Hone, J.; Heinz, T. F.; Shan, J. Tightly Bound Trions in Monolayer MoS 2. Nature materials 2013, 12 (3), 207.

(26) Bilgin, I.; Liu, F.; Vargas, A.; Winchester, A.; Man, M. K.; Upmanyu, M.; Dani, K. M.; Gupta, G.; Talapatra, S.; Mohite, A. D.; Kar, S. Chemical Vapor Deposition Synthesized Atomically Thin Molybdenum Disulfide with Optoelectronic-Grade Crystalline Quality. ACS nano 2015, 9 (9), 8822-8832.

(27) Bilgin, I.; Raeliarijaona, A. S.; Lucking, M. C.; Hodge, S. C.; Mohite, A. D.; de Luna Bugallo, A.; Terrones, H.; Kar, S. Resonant Raman and Exciton Coupling in High-Quality Single Crystals of Atomically Thin Molybdenum Diselenide Grown by Vapor-Phase Chalcogenization. ACS nano 2018, 12 (1), 740-750.

(28) Panwar, H.; Gupta, P. K.; Siddiqui, M. K.; Morales-Menendez, R.; Bhardwaj, P.; Singh, V. A Deep Learning and Grad-CAM Based Color Visualization Approach for Fast Detection of COVID-19 Cases Using Chest X-Ray and CT-Scan Images. Chaos, Solitons & Fractals 2020, 140, 110190. doi.org/10.1016/j.chaos.2020.110190.

(29) Soenksen, L. R.; Kassis, T.; Conover, S. T.; Marti-Fuster, B.; Birkenfeld, J. S.; Tucker-Schwartz, J.; Naseem, A.; Stavert, R. R.; Kim, C. C.; Senna, M. M.; Avilés-Izquierdo, J.; Collins, J. J.; Barzilay, R.; Gray, M. L. Using Deep Learning for Dermatologist-Level Detection of Suspicious Pigmented Skin Lesions from Wide-Field Images. Science Translational Medicine 2021, 13 (581). doi.org/10.1126/scitranslmed.abb3652.

(30) Johnson, J.; Sharma, G.; Srinivasan, S.; Masakapalli, S. K.; Sharma, S.; Sharma, J.; Dua, V. K. Enhanced Field-Based Detection of Potato Blight in Complex Backgrounds Using Deep Learning. Plant Phenomics 2021, 2021. doi.org/10.34133/2021/9835724.

(31) Cuthill, J. F. H.; Guttenberg, N.; Ledger, S.; Crowther, R.; Huertas, B. Deep Learning on Butterfly Phenotypes Tests Evolution's Oldest Mathematical Model. Science Advances 2019, 5 (8), eaaw4967. doi.org/10.1126/sciadv.aaw4967.

(32) Vargas, A.; Liu, F.; Lane, C.; Rubin, D.; Bilgin, I.; Hennighausen, Z.; DeCapua, M.; Bansil, A.; Kar, S. Tunable and Laser-Reconfigurable 2D Heterocrystals Obtained by Epitaxial Stacking of Crystallographically Incommensurate Bi2Se3 and MoS2 Atomic Layers. Science advances 2017, 3 (7), e1601741.

(33) Hejazi, D.; Liu, S.; Farnoosh, A.; Ostadabbas, S.; Kar, S. Development of Use-Specific High-Performance Cyber-Nanomaterial Optical Detectors by Effective Choice of Machine Learning Algorithms. Machine Learning: Science and Technology 2020, 1 (2), 025007.

The invention claimed is:

1. A device for determining a spectral characteristic of an electromagnetic radiation within a wavelength band without dispersion, the device comprising:

a set of three or more broadband filters, wherein each of said filters comprises a two-dimensional material, and wherein each of said filters has a different wavelength-dependent transmittance over the wavelength band compared to other filters of the set;

one or more detectors suitable for detecting electromagnetic radiation over the wavelength band transmitted through said filters; wherein the device is configured to allow the electromagnetic radiation to penetrate the two-dimensional material of said filters and illuminate the one or more detectors, whereby the detector provides an electrical signal characteristic of the electromagnetic radiation transmitted through each of the filters; and a processor and a memory comprising instructions for identifying a spectral characteristic of said electromagnetic radiation using said electrical signals.

2. The device of claim 1, wherein the two-dimensional materials are selected from the group consisting of molybdenum disulfide, tungsten disulfide, boron nitride, bismuth selenide, phosphorene, graphene, molybdenum diselenide, tungsten diselenide, molybdenum ditelluride, and combinations thereof.

3. The device of claim 1, wherein the two-dimensional materials are selected from transition metal dichalcogenides.

4. The device of claim 1, wherein the set of filters comprises at least four different two-dimensional materials.

5. The device of claim 1, wherein at least one of the filters is configured as a mosaic of two or more different two-dimensional materials.

6. The device of claim 1, wherein the electromagnetic radiation is polychromatic, and the spectral characteristic determined comprises two or more peak wavelengths of the electromagnetic radiation.

7. The device of claim 1, wherein the spectral characteristic determined is a spectrum of the electromagnetic radiation.

8. The device of claim 1 that is configured to use artificial intelligence to determine said spectral characteristic.

9. The device of claim 8, wherein the device is pre-trained using a set of different electromagnetic radiation sources having different spectral characteristics.

10. The device of claim 1, wherein the wavelength band corresponds to a visible wavelength band or portion thereof, and the determined spectral characteristic corresponds to a color.

11. The device of claim 1, wherein the one or more detectors are each selected from the group consisting of a gamma ray detector, an X-ray detector, a UV/Visible detector, a photodetector, a photodiode, an IR detector, and a far infrared detector.

12. The device of claim 1, wherein the wavelength band is in the gamma radiation spectrum, x-ray radiation spectrum, ultraviolet radiation spectrum, visible radiation spectrum, or infrared radiation spectrum.

13. The device of claim 1, further comprising one or more of a wireless transmitter or transceiver, an output display, a battery, and a lens or other element for collecting, directing, focusing, or filtering electromagnetic radiation entering the device.

14. The device of claim 1, wherein the set of filters is configured for sequential positioning of each of the filters to permit electromagnetic radiation transmitted through one of said filters to be detected by said one or more detectors.

15. The device of claim 14, wherein the set of filters is configured as a daisy wheel capable of rotation to provide said positioning.

16. The device of claim 1, wherein the device comprises at least 12 different said filters.

17. The device of claim 16, wherein the device is capable of determining a spectrum of said electromagnetic radiation with a median spectral deviation of less than 2%, wherein said electromagnetic radiation is different from any electromagnetic radiation used to train the device.

18. The device of claim 1, wherein the device is capable of continued automatic training using results obtained from use of the device.

19. A plurality of devices of claim 1 configured as an array.

20. The plurality of devices of claim 19, configured as an imaging device.

21. The plurality of devices of claim 20, wherein the wavelength band of the individual devices corresponds to a visible wavelength band or portion thereof, and the plurality of devices provides a color image as output.

22. The device of claim 1, or an array of devices of claim 1, which is incorporated into a machine, robot, drone, color analysis device, self-driving vehicle, image recognition system, telescope, microscope, satellite, security system, spectrometer, detector, or artificial eye.

23. A method of determining a spectral characteristic of an electromagnetic radiation within a wavelength band, the method comprising:

(a) providing the device of claim 1, or an array of devices of claim 1;

(b) inputting the electromagnetic radiation into the device(s), whereby the radiation is transmitted through the three or more filters and then is detected by one of the one or more detectors, whereby electrical signals are provided to the processor of the device(s); and (c) analyzing the electrical signals, whereby a spectral characteristic of the electromagnetic radiation is identified.

* * * * *